US008469810B2

(12) United States Patent
Nakanishi et al.

(10) Patent No.: US 8,469,810 B2
(45) Date of Patent: Jun. 25, 2013

(54) STORAGE MEDIUM HAVING GAME PROGRAM STORED THEREON AND GAME APPARATUS

(75) Inventors: Keigo Nakanishi, Kyoto (JP); Hiroshi Matsunaga, Kyoto (JP); Shinichi Ikematsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1041 days.

(21) Appl. No.: 11/252,739

(22) Filed: Oct. 19, 2005

(65) Prior Publication Data
US 2006/0111182 A1 May 25, 2006

(30) Foreign Application Priority Data
Nov. 19, 2004 (JP) ................................. 2004-336361

(51) Int. Cl.
*A63F 13/06* (2006.01)
*G06F 3/048* (2006.01)

(52) U.S. Cl.
USPC .......................................... 463/37; 715/823

(58) Field of Classification Search
USPC ................................................... 463/37
See application file for complete search history.

(56) References Cited

U.S. PATENT DOCUMENTS

| 4,293,734 | A | * | 10/1981 | Pepper, Jr. ................ 178/18.01 |
|---|---|---|---|---|
| 4,764,944 | A | * | 8/1988 | Finlayson ..................... 378/20 |
| 5,265,516 | A | * | 11/1993 | Usa et al. ...................... 84/600 |
| 5,386,219 | A | * | 1/1995 | Greanias et al. ............ 345/174 |
| 5,406,307 | A | * | 4/1995 | Hirayama et al. ........... 715/800 |
| 5,457,476 | A | * | 10/1995 | Jenson ......................... 715/823 |
| 5,483,235 | A | * | 1/1996 | Hanson et al. .................. 341/20 |
| 5,488,204 | A | * | 1/1996 | Mead et al. ................ 178/18.06 |
| 5,625,377 | A | * | 4/1997 | Jenson ......................... 715/860 |
| 5,754,430 | A | * | 5/1998 | Sawada ........................ 701/209 |
| 5,777,605 | A | * | 7/1998 | Yoshinobu et al. ........... 345/173 |
| 5,790,106 | A | * | 8/1998 | Hirano et al. ................ 345/173 |
| 5,848,298 | A | * | 12/1998 | Steere et al. ................... 710/62 |
| 5,940,158 | A | * | 8/1999 | Kawabata ..................... 349/179 |
| 6,310,610 | B1 | * | 10/2001 | Beaton et al. ................ 345/173 |
| 6,411,283 | B1 | * | 6/2002 | Murphy ........................ 345/173 |
| 6,424,338 | B1 | * | 7/2002 | Anderson ..................... 345/173 |
| 7,307,622 | B2 | * | 12/2007 | Uchiyama .................... 345/173 |
| 7,310,088 | B2 | | 12/2007 | Senzui et al. |
| 7,392,154 | B2 | * | 6/2008 | Nakanishi et al. ........... 702/155 |
| 2001/0013855 | A1 | * | 8/2001 | Fricker et al. ................ 345/156 |
| 2002/0056575 | A1 | * | 5/2002 | Keely et al. ................ 178/18.01 |
| 2002/0141643 | A1 | * | 10/2002 | Jaeger ........................... 382/181 |
| 2003/0122774 | A1 | * | 7/2003 | Harada ......................... 345/156 |
| 2004/0196267 | A1 | * | 10/2004 | Kawai et al. ................. 345/173 |

(Continued)

FOREIGN PATENT DOCUMENTS

| JP | 11-053115 | 2/1999 |
|---|---|---|
| JP | 2002-939 A | 1/2002 |
| JP | 2003-296014 A | 10/2003 |

*Primary Examiner* — Melba Bumgarner
*Assistant Examiner* — Seng Heng Lim
(74) *Attorney, Agent, or Firm* — Nixon & Vanderye P.C.

(57) ABSTRACT

Reference coordinates in a coordinate system and designated coordinates based on coordinate information outputted by a pointing device are provided, and a distance between the reference coordinates and the designated coordinates is calculated. When a first mode is selected, a calculated distance is converted into a predetermined parameter using a first conversion function. On the other hand, when a second mode is selected, a calculated distance is converted into a parameter using a second conversion function. According to whether the first mode is selected or the second mode is selected, a game is processed based on the aforementioned parameter.

18 Claims, 14 Drawing Sheets

U.S. PATENT DOCUMENTS

| | | | |
|---|---|---|---|
| 2004/0224638 A1* | 11/2004 | Fadell et al. | 455/66.1 |
| 2004/0252109 A1* | 12/2004 | Trent et al. | 345/174 |
| 2004/0259637 A1* | 12/2004 | Kimura et al. | 463/31 |
| 2005/0052406 A1* | 3/2005 | Stephanick et al. | 345/156 |
| 2005/0052425 A1* | 3/2005 | Zadesky et al. | 345/173 |
| 2005/0110768 A1* | 5/2005 | Marriott et al. | 345/173 |
| 2005/0134578 A1* | 6/2005 | Chambers et al. | 345/184 |
| 2005/0179672 A1* | 8/2005 | Chiu et al. | 345/173 |
| 2005/0249386 A1* | 11/2005 | Juh | 382/124 |
| 2006/0007182 A1* | 1/2006 | Sato et al. | 345/173 |
| 2006/0073899 A1* | 4/2006 | Kasamatsu et al. | 463/43 |
| 2006/0109259 A1* | 5/2006 | Ohta | 345/173 |
| 2006/0121985 A1* | 6/2006 | Nakanishi et al. | 463/36 |

* cited by examiner

F I G. 3
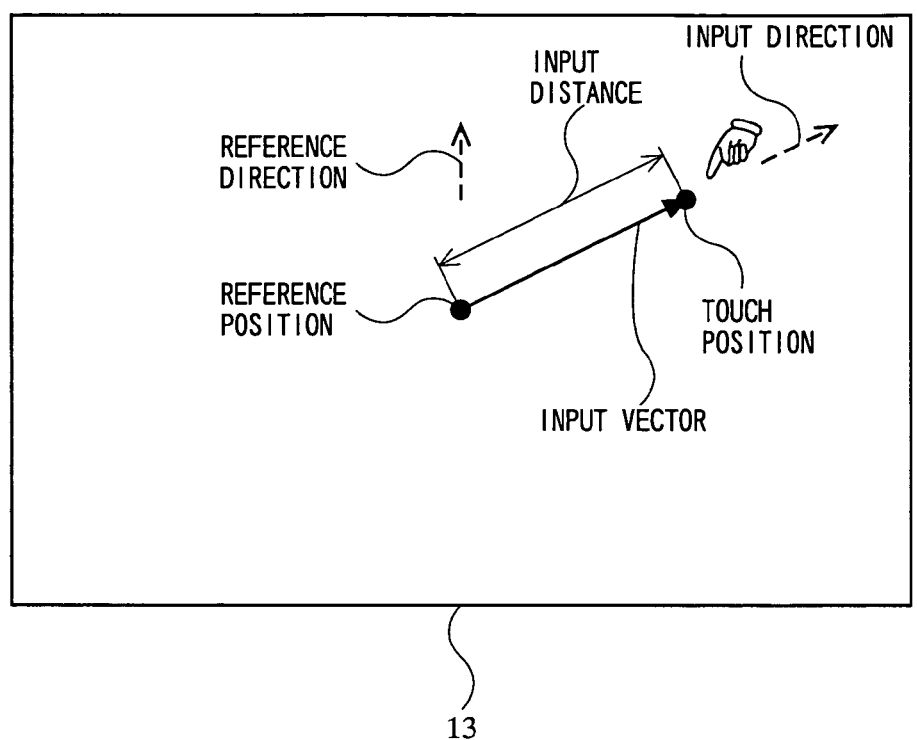

F I G. 6
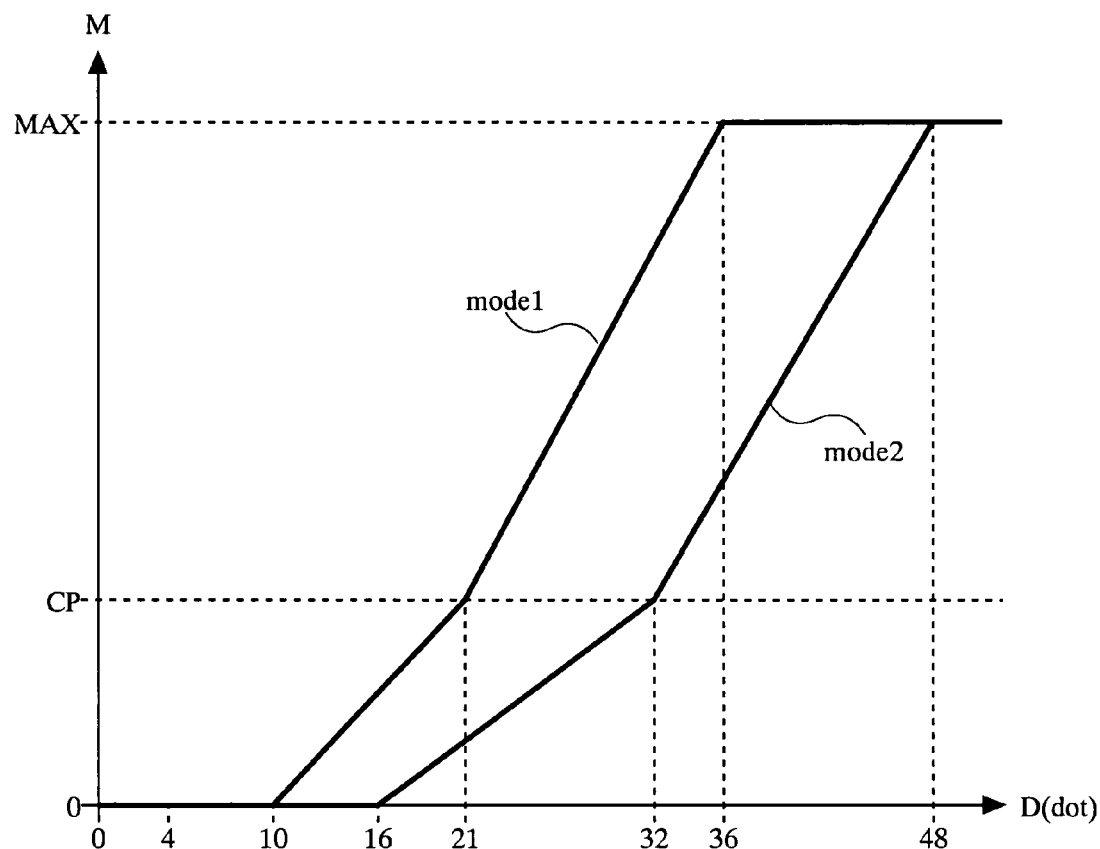
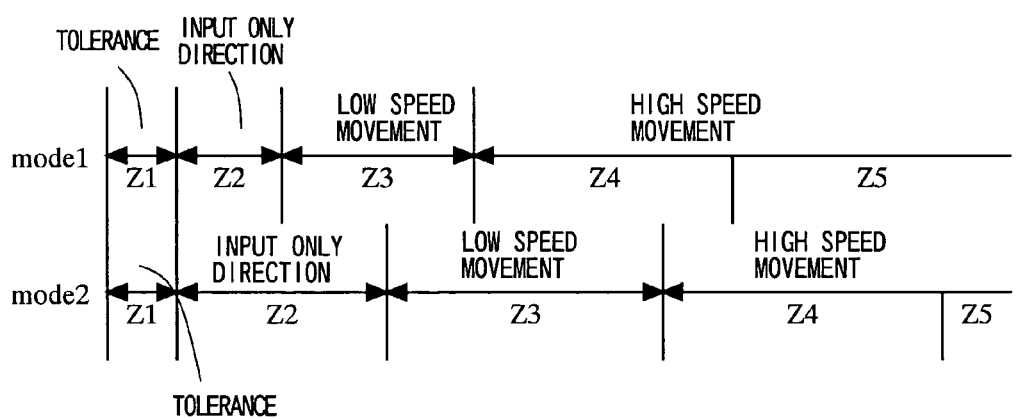

F I G. 1 4
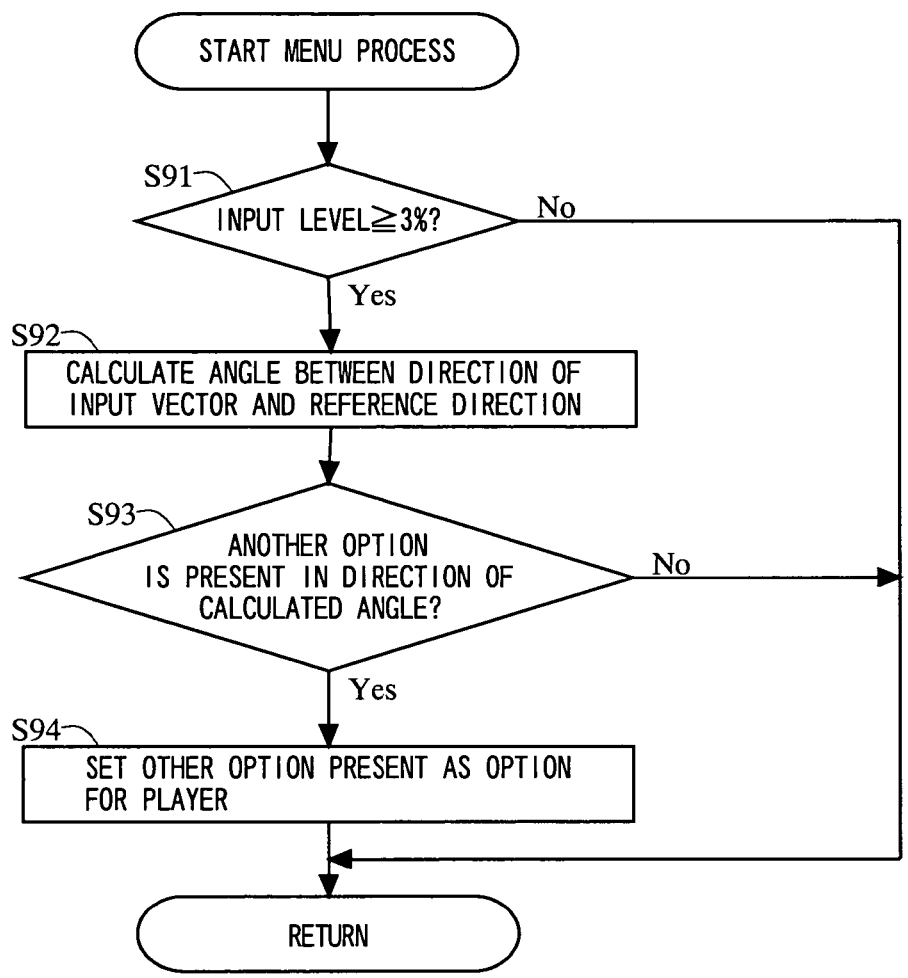

STORAGE MEDIUM HAVING GAME PROGRAM STORED THEREON AND GAME APPARATUS

BACKGROUND

1. Field of the Invention

The present technology relates to a storage medium having a game program stored thereon and a game apparatus, and more particularly to a storage medium having stored thereon a game program for use with a computer game for which a pointing device such as a touch panel is employed and a game apparatus.

2. Description of the Background Art

Conventionally, well known is an input method in which an input magnitude and an input direction are determined based on coordinates designated by a pointing device. An input device operated using a touch panel by a player is developed as disclosed in, for example, Japanese Laid-Open Patent Publication No. 11-53115 (hereinafter, referred to as Patent Document 1). As shown in FIG. 3 of Patent Document 1, the input device as disclosed in Patent Document 1 determines a movement direction and a movement distance of a cursor based on a direction and distance between the center of the touch panel and touch coordinates at which the player touches the touch panel.

Here, a player will touch-operate a touch panel with an instrument such as a stylus or will directly touch-operate a touch panel with his or her finger. In general, when a player drags, on a touch panel, a stick type instrument such as a stylus, the stick type instrument tends to make its drag distance longer than the player directly operates the touch panel with his or her finger even if the player attempts to drag the stick type instrument and the finger over the same distance. This is because a distance between a position at which the player holds the stick type instrument and a position at which the stick type instrument (that is, a tip of the instrument) touches the touch panel is long, and therefore the stick type instrument has a longer distance between a fulcrum and a point of action for controlling the touch panel as compared to a case where the player directly touch-operates a touch panel with his or her finger. Accordingly, the player feels that controllability is different depending on a method in which the player touch-operates the touch panel. The player will also feel that controllability is different depending on how old the player is, how skillfully the player controls a touch panel, and the like.

However, the input device as disclosed in Patent Document 1 calculates a direction and distance between touch coordinates and the center of a touch panel according to a player's touch-operation so as to determine two parameters (a direction and a movement distance), and the method for determining two parameters cannot be changed. Accordingly, the aforementioned input device provides a touch panel which does not allow a player to adjust controllability, and the player has to perform game play feeling that controllability depends on, for example, the player's skill, and a method for controlling the touch panel as described above.

SUMMARY

Therefore, a feature of the exemplary embodiment presented herein is to provide a storage medium having stored thereon a game program and a game apparatus for enabling a player to adjust controllability depending on a player's age, a player's skill, a method for controlling the touch panel with a pointing device, and the like.

The exemplary embodiment has the following features to attain the above. The reference numerals, step numbers (a step is abbreviated as S and only a step No. is indicated), and the like in the parentheses indicate the correspondence with the embodiment described below in order to aid in understanding the exemplary embodiment and are not intended to limit, in any way, the scope of the exemplary embodiment.

A first aspect of an exemplary embodiment is directed to a storage medium having stored thereon a game program executed by a computer (21) in a game apparatus (1) which is operated using a pointing device (13). The pointing device outputs coordinate information based on a given coordinate system according to an operation of a player. The game program causes the computer to execute: a selection step (S51); a reference coordinate setting step (S53); a reference coordinate storage step (S53); a designated coordinate setting step (S54); a calculation step (S55); a first parameter determination step (S57); a second parameter determination step (S57); and a game process step (S59, S60, S62, and S63). The selection step selects one of a first mode (mode1) and a second mode (mode2) based on a selection from the player. The reference coordinate setting step sets reference coordinates (a reference position) in the coordinate system. The reference coordinate storage step stores the reference coordinates. The designated coordinate setting step sets designated coordinates (touch position) in the coordinate system based on the coordinate information outputted by the pointing device. The calculation step calculates a distance (input distance D) from the reference coordinates to the designated coordinates. The first parameter determination step converts, when the first mode is selected in the selection step, the distance calculated in the calculation step into a predetermined parameter (I) using a first conversion function (a function for mode1 shown in FIG. 4). The second parameter determination step converts, when the second mode is selected in the selection step, the distance calculated in the calculation step into the parameter using a second conversion function (a function for mode2 shown in FIG. 4). The game process step performs a game process, by using one of the parameter determined in the first parameter determination step and the parameter determined in the second parameter determination step, according to a selection in the selection step between the first mode and the second mode. The pointing device is an input device for designating an input position or coordinates on the screen, such as a touch panel, a mouse, a track pad, and a track ball. The coordinate system used for each input device is a touch panel coordinate system or a screen coordinate system.

In a second aspect based on the first aspect, the second conversion function is a function for converting the distance calculated in the calculation step into a value smaller than a value into which the distance calculated in the calculation step is converted using the first conversion function.

In a third aspect based on the first aspect, the game program stored in the storage medium causes the computer to further execute a reference distance setting step (S52). The reference distance setting step sets, when the first mode is selected in the selection step, a first reference distance (36 dots in FIG. 4) as a reference for the distance calculated in the calculation step, and sets, when the second mode is selected in the selection step, a second reference distance (48 dots in FIG. 4) as a reference for the distance calculated in the calculation step. The first conversion function used in the first parameter determination step is a function for calculating, as the parameter, a ratio of the distance calculated in the calculation step to the first reference distance set in the reference distance setting step. The second conversion function used in the second parameter determination step is a function for calculating, as the parameter, a ratio of the distance calculated in the calculation step to the second reference distance set in the reference distance setting step.

In a fourth aspect based on the third aspect, when the selection step selects the first mode and the distance calculated in the calculation step is longer than the first reference distance (greater than or equal to 36 dots in FIG. 4), the first parameter determination step determines the parameter as a ratio of 100% using the first conversion function. When the selection step selects the second mode and the distance calculated in the calculation step is longer than the second reference distance (greater than or equal to 48 dots in FIG. 4), the second parameter determination step determines the parameter as a ratio of 100% using the second conversion function.

In a fifth aspect based on the third aspect, the pointing device is a touch panel. The first mode is used when a player directly touch-operates the touch panel with a finger. The second mode is used when a player touch-operates the touch panel with a tip of a stick type member (16). The reference distance setting step sets the second reference distance to be longer than the first reference distance.

In a sixth aspect based on the first aspect, the game process step determines a movement speed (movement distance M) of a game object appearing in a virtual game space based on the parameter.

In a seventh aspect based on the first aspect, the calculation step further calculates a direction from the reference coordinates to the designated coordinates (S81). The game process step performs the process based on the input level and the direction.

In an eighth aspect based on the seventh aspect, the game process step determines a direction of a game object appearing in a virtual game space based on the direction (S82).

In a ninth aspect based on the first aspect, the reference coordinate setting step sets, as the reference coordinates, designated coordinates which are initially set in the designated coordinate setting step.

In a tenth aspect based on the first aspect, the game program stored in the storage medium causes the computer to further executes: a first game parameter determination step; a second game parameter determination step; a third game parameter determination step; and a fourth game parameter determination step. The first game parameter determination step converts, when a parameter determined in the first parameter determination step is smaller than a first threshold value, the parameter into a game parameter using a third conversion function. The second game parameter determination step converts, when a parameter determined in the first parameter determination step is greater than or equal to the first threshold value, the parameter into the game parameter using a fourth conversion function for converting the parameter into a value greater than a value into which the parameter is converted using the third conversion function. The third game parameter determination step converts, when a parameter determined in the second parameter determination step is smaller than a second threshold value, the parameter into the game parameter using a fifth conversion function. The fourth game parameter determination step converts, when a parameter determined in the second parameter determination step is greater than or equal to the second threshold value, the parameter into the game parameter using a sixth conversion function for converting the parameter into a value greater than a value into which the parameter is converted using the fifth conversion function. The game process step performs the process using the game parameter determined in the first game parameter determination step or the second game parameter determination step, when the selection step selects the first mode, and performs the process using the game parameter determined in the third game parameter determination step or the fourth game parameter determination step, when the selection step selects the second mode.

In an eleventh aspect based on the tenth aspect, the second threshold value is greater than the first threshold value.

In a twelfth aspect based on the first aspect, the calculation step further calculates a direction from the reference coordinates to the designated coordinates. The game process step performs the process based on only the direction calculated in the calculation step when the selection step selects the first mode and the parameter determined in the first parameter determination step is smaller than a first threshold value, or when the selection step selects the second mode and the parameter determined in the second parameter determination step is smaller than a second threshold value. The game process step performs the process based on the parameter and the direction when the selection step selects the first mode and the parameter determined in the first parameter determination step is greater than or equal to the first threshold value, or when the selection step selects the second mode and the parameter determined in the second parameter determination step is greater than or equal to the second threshold value.

In a thirteenth aspect based on the twelfth aspect, the second threshold value is greater than the first threshold value.

A fourteenth aspect of an exemplary embodiment is directed to a game apparatus which is operated using a pointing device. The pointing device outputs coordinate information based on a given coordinate system according to an operation of a player. The game apparatus comprises: a reference coordinate setting means; a reference coordinate storage means; a designated coordinate setting means; a calculation means; a selection means; a first parameter determination means; a second parameter determination means; and a game process means. The reference coordinate setting means sets reference coordinates in the coordinate system. The reference coordinate storage means stores the reference coordinates. The designated coordinate setting means sets designated coordinates in the coordinate system based on the coordinate information outputted by the pointing device. The calculation means calculates a distance from the reference coordinates to the designated coordinates. The selection means selects one of a first mode and a second mode based on a selection from the player. The first parameter determination means converts, when the first mode is selected by the selection means, the distance calculated by the calculation means into a predetermined parameter using a first conversion function. The second parameter determination means converts, when the second mode is selected by the selection means, the distance calculated by the calculation means into the parameter using a second conversion function. The game process means performs a game process, by using one of the parameter determined by the first parameter determination means and the parameter determined by the second parameter determination means, according to a selection by the selection means between the first mode and the second mode.

A fifteenth aspect of an exemplary embodiment is directed to a storage medium having stored thereon a program executed by a computer in an information processing apparatus which is operated using a pointing device. The pointing device outputs coordinate information based on a given coordinate system according to an operation of a user. The program causes the computer to execute: a selection step; a reference coordinate setting step; a reference coordinate storage step; a designated coordinate setting step; a calculation step; a first parameter determination step; a second parameter determination step; and an operation process step. The selection step selects one of a first mode and a second mode based on a selection from the user. The reference coordinate setting step sets reference coordinates in the coordinate system. The reference coordinate storage step stores the reference coordinates. The designated coordinate setting step sets designated coordinates in the coordinate system based on the coordinate information outputted by the pointing device. The calculation step calculates a distance from the reference coordinates to the designated coordinates. The first parameter determination step converts, when the first mode is selected in the selection step, the distance calculated in the calculation step into a predetermined parameter using a first conversion function. The second parameter determination step converts, when the second mode is selected in the selection step, the distance calculated in the calculation step into the parameter using a second conversion function. The operation process step processes an operation, by using one of the parameter determined in the first parameter determination step and the parameter determined in the second parameter determination step, according to a selection in the selection step between the first mode and the second mode.

According to the first aspect, a plurality of modes (a first mode and a second mode) are set according to a method for controlling a pointing device and the like so as to obtain an appropriate game parameter depending on the respective control methods. Further, in a process based on the mode, an input distance is converted into a parameter using a different conversion function depending on the mode, and a game process is performed using the parameter. That is, a game process can be made the same for different modes after a parameter is calculated, whereby the game process can be made the same in a plurality of modes for different controllabilities.

According to the second aspect, the same input distance can be converted into a greater parameter in the second mode than in the first mode.

According to the third aspect, in a process based on the mode, each input distance is converted into a ratio of the input distance to the reference distance according to the mode, and a game process can be performed using the ratio. That is, the game process can be made the same for the different modes after the ratio is calculated, whereby the game process can be made the same in a plurality of modes for different controllabilities.

According to the fourth aspect, when an input from a player has a value greater than the first reference distance and the second reference distance, such inputs are all converted into a maximum ratio (100%). Therefore, the maximum ratio is set as a maximum parameter, thereby facilitating the subsequent game process.

According to the fifth aspect, in general, when a player touch-operates a touch panel with a stick type member such as a stylus, the stick type member tends to make its input distance longer than the player directly touch-operates the touch panel with his or her finger. This is because a distance between a position at which the player holds the stick type member and a position at which the stick type member touches the touch panel (that is, a tip of the stick type member) is long, and therefore the stick type member has a longer distance between a fulcrum and a point of action during the touch panel operation as compared to a case where the player directly touch-operates a touch panel with his or her finger. Therefore, when the player touch-operates the touch panel using the stick type member, it is difficult to make an input having a short distance. According to the fifth aspect, a first mode and a second mode are set according to a method for controlling the touch panel. The reference distance is set longer for the second mode than for the first mode, thereby obtaining an appropriate game parameter depending on the respective methods for controlling the touch panel.

According to the sixth aspect, a parameter which is set according to an input distance inputted by the player with a pointing device can be used as a movement speed of a game object.

According to the seventh aspect, a game process can be performed based on a parameter represented as a direction from reference coordinates to designated coordinates.

According to the eighth aspect, a direction in which a player controls a pointing device can be used as a direction of a game object.

According to the ninth aspect, a player can recognize a position of reference coordinates while controlling the touch panel, and therefore it is not necessary for the player to visually confirm the position of the reference coordinates. Further, reference coordinates are not constantly fixed in the pointing device, whereby an operation can be started at any position in a coordinate system on the pointing device.

According to the tenth aspect, provided are a section in which a game parameter is determined as being relatively small against a distance between reference coordinates and designated coordinates and a section in which the game parameter is determined as being relatively large against the distance between reference coordinates and designated coordinates. Therefore, controllability with which a player controls a pointing device can be changed.

According to the twelfth aspect, when a player controls a pointing device so that a distance between the reference coordinates and the designated coordinates has a value greater than or equal to a predetermined threshold value, a game process can be performed depending on the distance and a direction. When a player controls a pointing device so that a distance between the reference coordinates and the designated coordinates has a value smaller than a predetermined threshold value, a game process can be performed depending on only a direction Further, a game apparatus and a program according to an exemplary embodiment presented herein enable the same effect as achieved by the aforementioned game program to be obtained.

These and other features, aspects and advantages of the exemplary embodiment presented herein will become more apparent from the following detailed description when taken in conjunction with the accompanying drawings.

BRIEF DESCRIPTION OF THE DRAWINGS

FIG. 3 is a diagram for explaining an input vector set when the touch panel 13 of FIG. 1 is touch-operated;

FIG. 6 is a graph for explaining a movement distance M against an input distance D based on a relationship between the graph of FIG. 4 and the graph of FIG. 5;

FIG. 14 shows a subroutine as a detailed operation of processing a menu in step 65 shown in FIG. 10.

DESCRIPTION OF THE PREFERRED EMBODIMENTS

Figure 1:
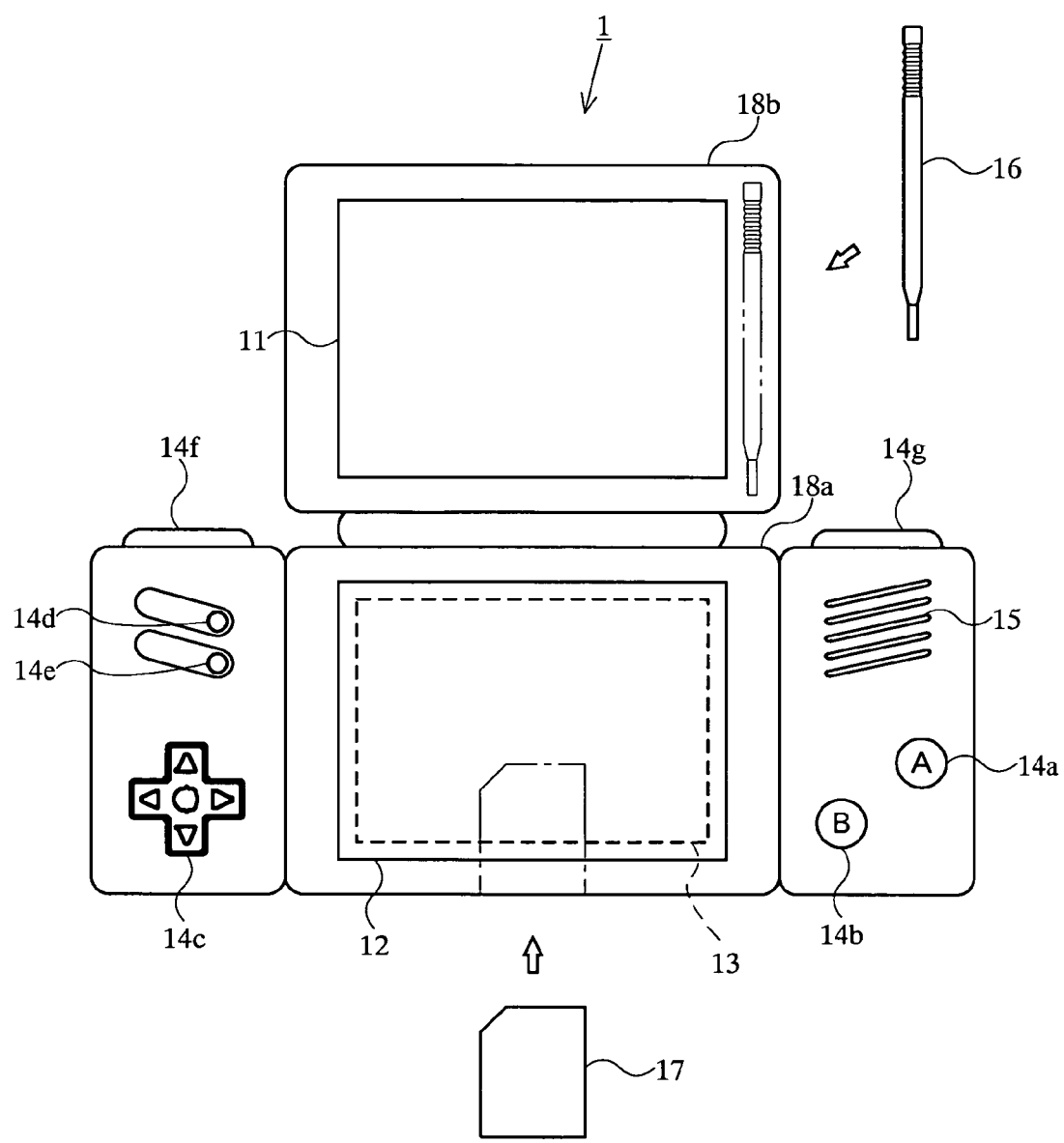
FIG. 1 is an outline view illustrating a game apparatus 1 executing a game program according to an embodiment.

A game apparatus which executes a game program according to an embodiment will be described with reference to the drawings. FIG. 1 is an outline view illustrating a game apparatus 1 which executes a game program according to the exemplary embodiment presented herein. Here, a portable game apparatus is shown as an example of the game apparatus 1.

In FIG. 1, the game apparatus 1 according to the present embodiment is accommodated in a housing 18 so that two liquid crystal display devices (hereinafter, referred to as "LCDs") 11 and 12 are placed in predetermined positions. Specifically, in a case where the first LCD 11 and the second LCD 12 are to be positioned one on top of the other, the housing 18 is composed of a lower housing 18a and an upper housing 18b, the upper housing 18b being pivotably supported by a portion of the upper side of the lower housing 18a. The upper housing 18b has a planar contour which is slightly larger than that of the first LCD 11. The upper housing 18b has an opening in one principal face thereof, through which a display screen of the first LCD 11 is exposed. The lower housing 18a has a more elongated planar contour than that of the upper housing 18b (i.e., so as to have a longer lateral dimension). An opening for exposing the display screen of the second LCD 12 is formed in a portion of the lower housing 18a which lies substantially in the center of the lower housing 18a along the lateral direction. A sound hole for the loudspeaker 15 is formed in either (right or left) wings of the lower housing 18a between which the second LCD 12 is interposed. An operation switch section 14 is provided on the right and left wings of the lower housing 18a between which the second LCD 12 is interposed.

The operation switch section 14 includes: an operation switch ("A" button) 14a and an operation switch ("B" button) 14b, which are provided on a principal face of the right wing of the lower housing 18a (lying to the right of the second LCD 12); a direction switch (cross key) 14c, a start switch 14d, and a select switch 14e, which are provided on a principal face of the left wing of the lower housing 18a (lying to the left of the second LCD 12); and side switches 14f and 14g. The operation switches 14a and 14b are used forgiving instructions such as: "pass" "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG. The direction switch 14c is used by a player for providing instructions concerning directions on the game screen, e.g., instructions of moving directions of (i.e., a direction in which to move) a player object (or a player character) that can be controlled by using the operation switch section 14, or instructions of a moving direction for a cursor, for example. The side switch ("L" button) 14f and the side switch ("R" button) 14g are provided at the left and right ends of an upper face (upper side face) of the lower housing 18a. As necessary, more operation switches may be added.

Further, a touch panel 13 (an area marked by dotted lines in FIG. 1) is mounted on the upper principal face of the second LCD 12 as an example of the input device of the present invention. The touch panel 13 may be of any one of, for example, a resistive film type, an optical type (infrared type), or a capacitive coupling type. The touch panel 13 is, for example, a pointing device which, when a stylus 16 (or a finger) is pressed against or moved or dragged on the upper principal face of the touch panel 13, detects the coordinate position of the stylus 16 and outputs coordinate data.

As necessary, a hole (an area marked by double-dot lines in FIG. 1) for accommodating the stylus 16 with which to manipulate the touch panel 13 is provided near a side face of the upper housing 18b. The hole can hold the stylus 16. In a portion of a side face of the lower housing 18a is provided a cartridge receptacle (an area marked by dash-dot lines in FIG. 1), into which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18a (or alternatively the upper housing 18b) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Figure 2:
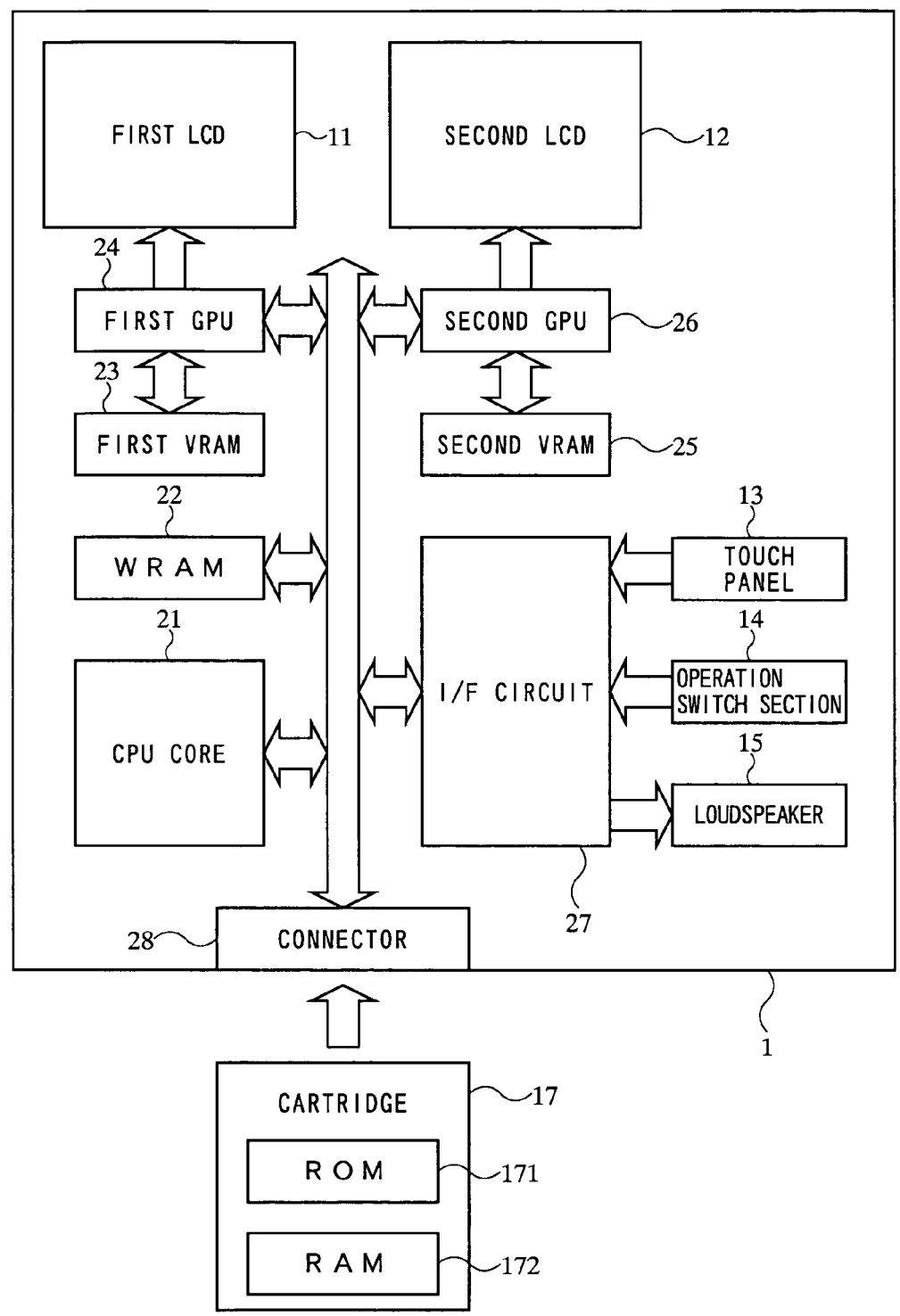
FIG. 2 is a block diagram illustrating an internal structure of the game apparatus 1 shown in FIG. 1.

Next, referring to FIG. 2, the internal structure of the game apparatus 1 will be described. FIG. 2 is a block diagram illustrating an internal structure of the game apparatus 1 of FIG. 1.

In FIG. 2, a CPU core 21 is mounted on the electronic circuit board accommodated in the housing 18. Via a predetermined bus, the CPU core 21 is connected to a connector 28 for enabling connection with the cartridge 17, an input/output interface (I/F) circuit 27, a first graphics processing unit (first GPU) 24, a second graphics processing unit (second GPU) 26, and a working RAM (WRAM) 22.

The cartridge 17 is detachably connected to the connector 28. As described above, the cartridge 17 is a storage medium for storing a game program. Specifically, the cartridge 17 includes a ROM 171 for storing a game program and a RAM 172 for storing backup data in are writable manner. A game program which is stored in the ROM 171 of the cartridge 17 is loaded to a WRAM 22, and the game program having been loaded to the WRAM 22 is executed by the CPU core 21. Temporary data which is obtained by the CPU core 21 executing the game program and data from which to generate images are stored in the WRAM 22.

Thus, the ROM 171 has stored thereon a game program which comprises instructions and data which are of a format executable by a computer in the game apparatus 1, in particular by the CPU core 21. The game program is loaded to the WRAM 22 as appropriate, and executed. Although the present embodiment illustrates an example where the game program and the like are stored on the cartridge 17, the game program and the like may be supplied via any other medium or via a communications circuit.

The touch panel 13, the operation switch section 14, and the loudspeaker 15 are connected to the I/F circuit 27. The loudspeaker 15 is placed inside the aforementioned sound hole.

The first GPU 24 is connected to a first video-RAM (hereinafter "VRAM") 23. The second GPU 26 is connected to a second video-RAM (hereinafter "VRAM") 25. In accordance with an instruction from the CPU core 21, the first GPU 24 generates a first game image based on the data used for generation of image which is stored in the WRAM 22, and writes image data into the first VRAM 23. In accordance with an instruction from the CPU core 21, the second GPU 26 generates a second game image based on the data used for generation of image which is stored in the WRAM 22, and writes image data into the second VRAM 25.

The first GPU 24 is connected to the first LCD 11, and the second GPU 26 is connected to the second LCD 12. The first GPU 24 outputs to the first LCD 11 the first game image which has been written into the first VRAM 23 in accordance with an instruction from the CPU core 21, and the first LCD 11 displays the first game image having been outputted from the first GPU 24. The second GPU 26 outputs to the second LCD 12 the second game image which has been written into the second VRAM 25 in accordance with an instruction from the CPU core 21, and the second LCD 12 displays the second game image having been outputted from the second GPU 26.

The I/F circuit 27 is a circuit which governs exchanges of data between the CPU core 21 and the external input/output devices such as the touch panel 13, the operation switch section 14, and the loudspeaker 15. The touch panel 13 (including a device driver for the touch panel) has a touch panel coordinate system corresponding to the coordinate system of the second VRAM 25, and outputs data of position coordinates corresponding to a position which is inputted (designated) by means of the stylus 16 or the like. For example, the display screen of the second LCD 12 has a resolution of 256 dots×192 dots, and the touch panel 13 also has a detection accuracy of 256 dots×192 dots so as to correspond to the display screen. The detection accuracy of the touch panel 13 may be lower or higher than the resolution of the display screen of the second LCD 12.

Figure 4:
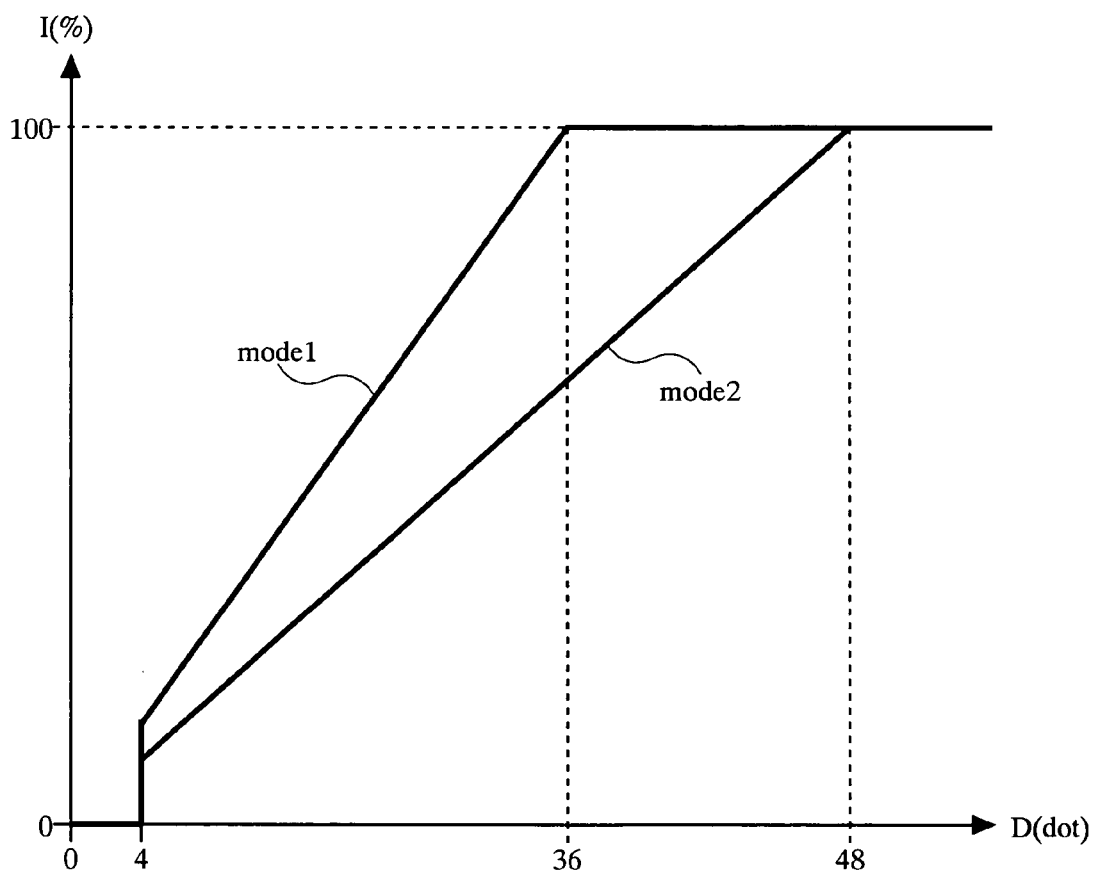
FIG. 4 is a graph for explaining an input level I against an input distance D.
Figure 5:
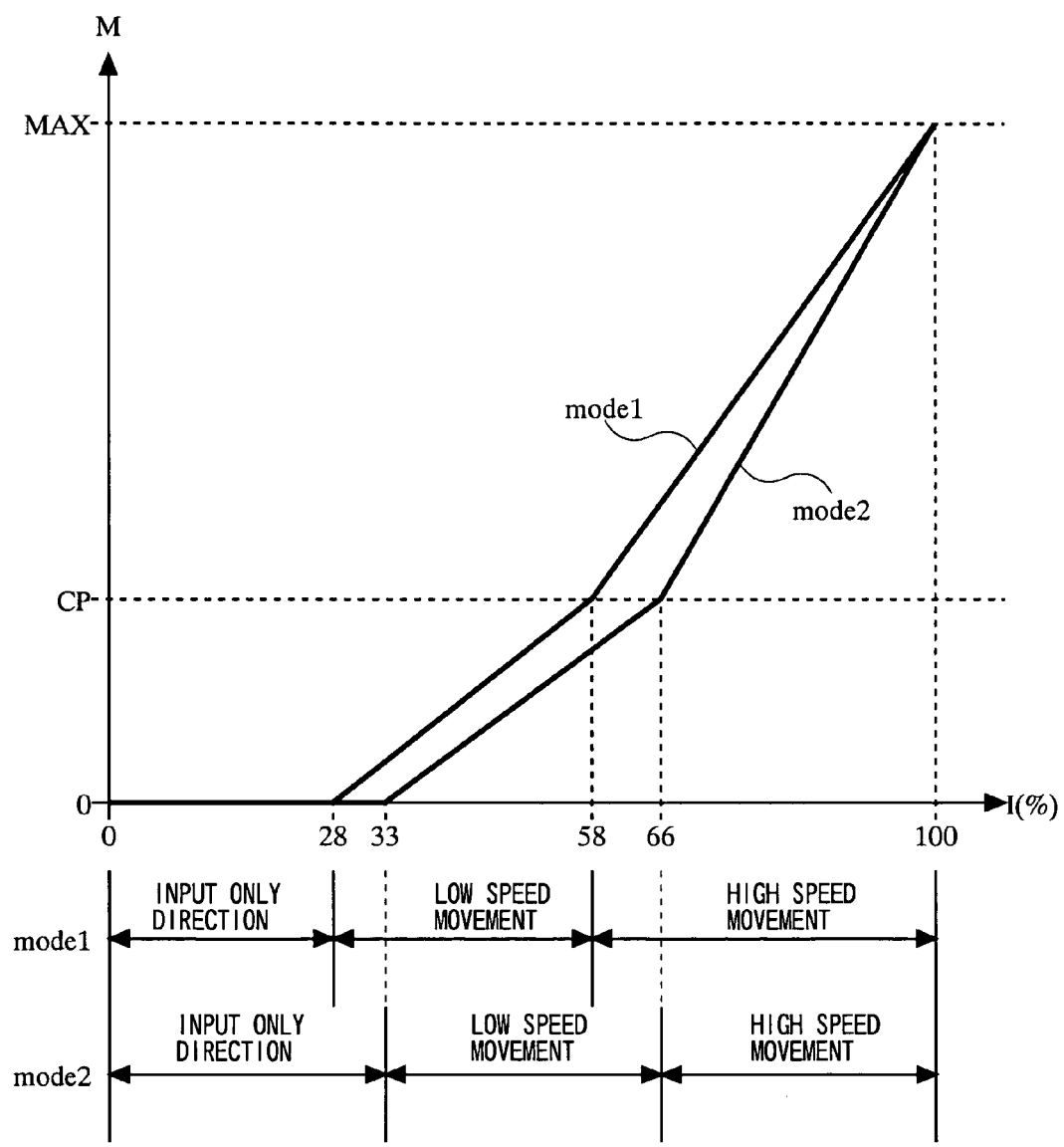
FIG. 5 is a graph for explaining a movement distance M against an input level I in a normal operation.
Figure 7:
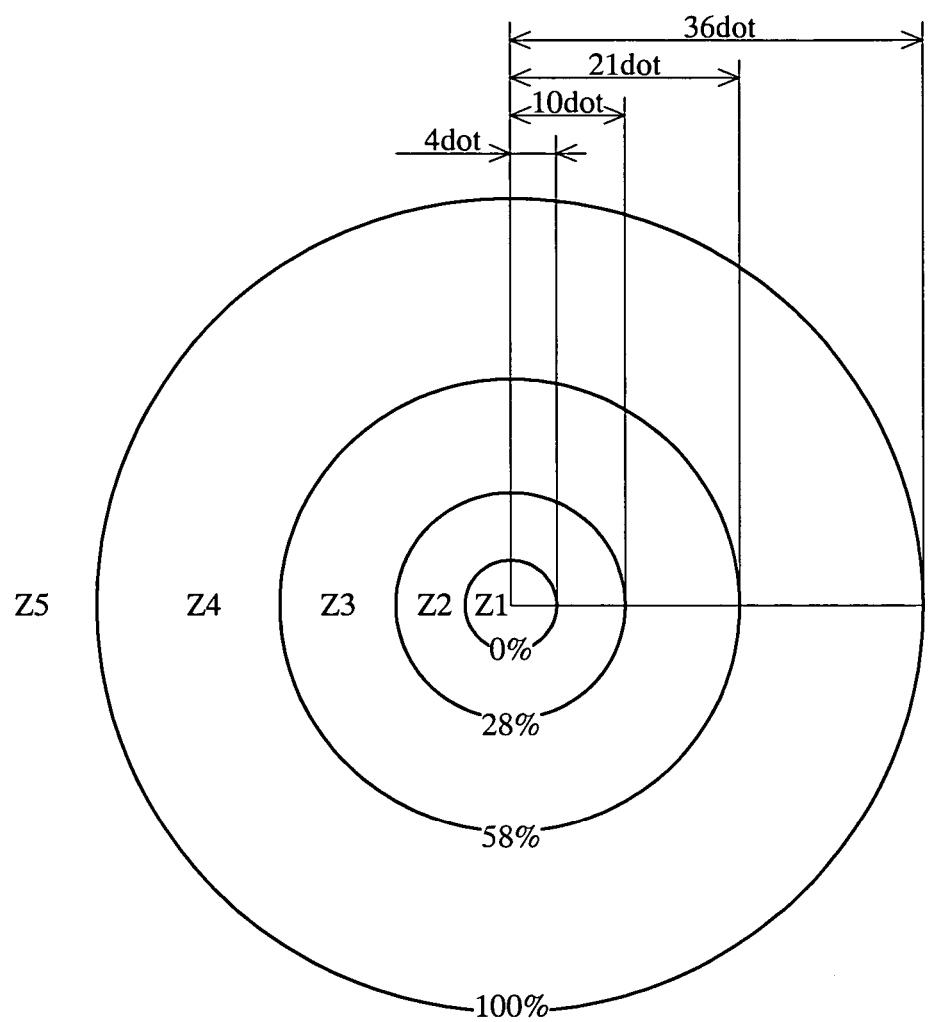
FIG. 7 is a diagram for explaining the respective operation instruction areas Z1 to Z5 which are set on the touch panel 13 in the case of a first mode "mode1"
Figure 8:
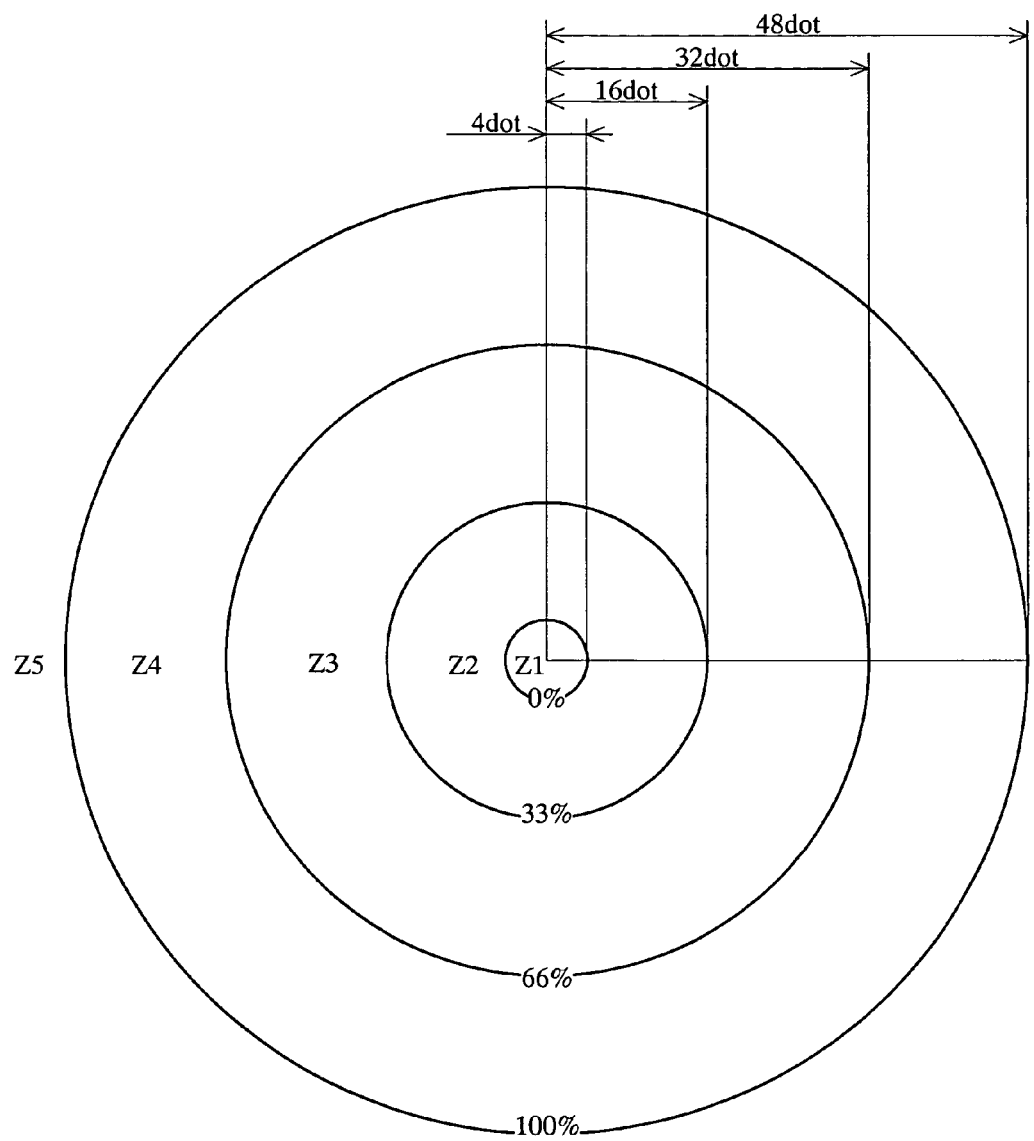
FIG. 8 is a diagram for explaining the respective operation instruction areas Z1 to Z5 which are set on the touch panel 13 in the case of a second mode "mode2"
Figure 9:
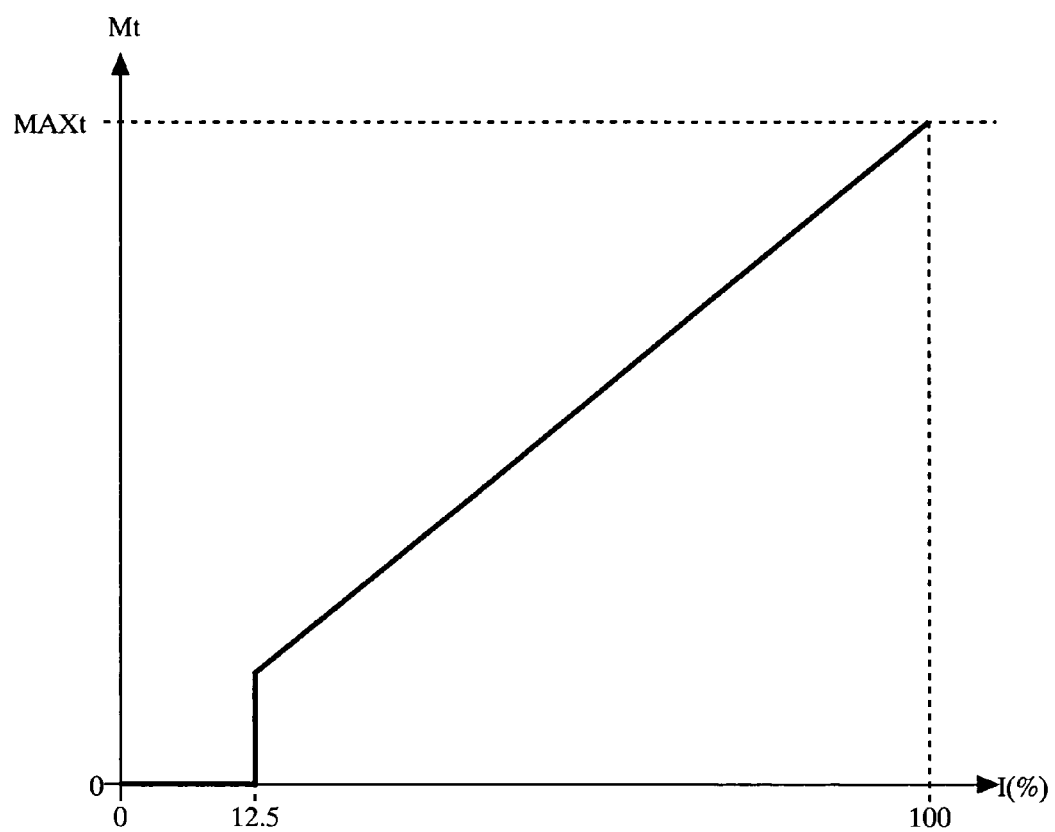
FIG. 9 is a graph for explaining a movement distance M against an input level I in a special operation.

Hereinafter, examples of processes which are performed by using a game program executed by the game apparatus 1 will be described in detail with reference to FIGS. 3 to 9. FIG. 3 is a diagram for showing an input vector which is set when the touch panel 13 is touch-operated. FIG. 4 shows a graph for explaining an input level I against an input distance D. FIG. 5 shows a graph for explaining a movement distance M against the input level I in a normal operation. FIG. 6 shows a graph for explaining a movement distance M against the input distance D based on a relationship between the graph of FIG. 4 and the graph of FIG. 5. FIG. 7 is a diagram for explaining the respective operation instruction areas Z1 to Z5 provided on the touch panel 13 in a first mode "mode1". FIG. 8 is a diagram for explaining the respective operation instruction areas Z1 to Z5 provided on the touch panel 13 in a second mode "mode2". FIG. 9 shows a graph for explaining a movement distance M against the input level I in a special operation.

In FIG. 3, a reference position which is a reference for touch-operation is firstly set on the touch panel 13. For example, the reference position may be fixed at a predetermined position on the touch panel 13 (for example, at the center of the touch panel 13) or may be set at a position designated by a player. When the reference position is set at a position designated by a player, for example, the reference position may be set as a position at which the player touches on the touch panel 13 (which corresponds to an operation of the touch panel 13 being firstly touched). The reference position may be moved according to the subsequent touch-operation. For example, when a distance between the reference position and a touch position described later is greater than a predetermined value, the reference position may be changed such that the distance has the predetermined value.

A vector connecting from the reference position to a position at which a player is touch-operating the touch panel 13 (touch position) is set as an input vector. That is, when the player changes the touch position, a direction of the input vector (input direction) and a length of the input vector (input distance) are changed. In an operation performed by the game apparatus 1 described later, the input direction is represented as an angle between the direction of the input vector and the reference direction (for example, an forward direction along the touch panel 13) and the input distance is represented as the number of dots on the touch panel 13.

As shown in FIG. 4, the game apparatus 1 calculates an input level I (%) according to an input distance D (dot) inputted from the touch panel 13. Here, the game apparatus 1 changes a conversion equation for converting the input distance D into the input level I according to a mode selected when a game is started. For example, the mode is set according to a method in which a player touch-operates the touch panel 13. Specifically, a first mode "mode1" is set as a mode in which a player touch-operates the touch panel 13 with his or her finger or with a predetermined pointing member fitted on the finger. Further, a second mode "mode2" is set as a mode in which a player touch-operates the touch panel 13 using the stylus 16. Hereinafter, although a description will be given of an example where two modes (a first mode "mode1" and a second mode "mode2) are set for the aforementioned purpose, the modes may be set according to another condition. For example, two or more modes may be set according to difficulty of a game. Further, multiple modes may be set according to an age of a player touch-operating the touch panel 13.

When the first mode "mode1" is set, the game apparatus 1 converts the input distance D (dot) into the input level I (%) using the conversion equation represented as:

$I=0 (D \leq 4 \text{ dots})$ $I=(100/36)*D (4 \text{ dots}<D \leq 36 \text{ dots})$ $I=100 (36 \text{ dots}<D)$ On the other hand, when the second mode "mode2" is set, the game apparatus 1 converts the input distance D (dot) into the input level I (%) using the conversion equation represented as:

$I=0 (D \leq 4 \text{ dots})$ $I=(100/48)*D (4 \text{ dots}<D \leq 48 \text{ dots})$ $I=100 (48 \text{ dots}<D)$ Thus, the game apparatus 1 converts the input distance $D \leq 4$ dots into the input level I=0 in both modes, and a tolerance area for the touch-operation (an area in which no game process is performed even when an operation is inputted) is provided. Further, the game apparatus 1 sets an input distance D corresponding to a maximum input level (I=100%) in the respective modes. An input distance greater than or equal to the input distance D is converted into the maximum input level. In other words, the game apparatus 1 converts, into the maximum input level, the input distance D greater than or equal to 36 dots in the first mode "mode1", while the game apparatus 1 coverts, into the maximum input level, the input distance D greater than or equal to 48 dots in the second mode "mode2". In a section in which the maximum input level is not obtained, the game apparatus 1 multiplies the input distance D by a coefficient representing a different gradient depending on the mode, and converts the multiplied input distance D into the input level I.

As shown in FIG. 5, the game apparatus 1 calculates a movement distance M according to an input level I (%) having been obtained. For example, the movement distance M shown in FIG. 5 is one of a plurality of game parameters, indicating a movement distance per unit time used in a normal operation in which a player character appearing in a game space moves on a field provided in the game space. Here, the game apparatus 1 changes the conversion equation for converting the input level I into the movement distance M according to the aforementioned mode.

When the first mode "mode1" is set, the game apparatus 1 converts the input level I (%) into the movement distance M using the conversion equation represented as:

$$M=0 (I \leq 28\%)$$

$$M=(CP/30)*I-(14/15)*CP (28\%<I \leq 58\%)$$

$$M=\{(MAX-CP)/42\}*I+(50*CP-29*MAX)/21$$
$$(58\%<I \leq 100\%)$$

Here, MAX represents a maximum movement distance per unit time over which the player character is allowed to move on the field (maximum movement distance MAX). Further, CP represents a change-over movement distance. The change-over movement distance CP represents a boundary at which the player character on the field changes from a low speed movement to a high speed movement. On the other hand, when the second mode "mode2" is set, the game apparatus 1 converts the input level I (%) into the movement distance M using the conversion equation represented as:

$$M=0 (I \leq 33\%)$$

$$M=(CP/33)*I-CP (33\%<I \leq 66\%)$$

$$M=\{(MAX-CP)/34\}*I+(50*CP-33*MAX)/17$$
$$(66\%<I \leq 100\%)$$

Thus, the game apparatus 1 converts the input level $I \leq 28\%$ into the movement distance M=0 in the first mode "mode1" and converts the input level $I \leq 33\%$ into the movement distance M=0 in the second mode "mode2", thereby setting a section in which the player character does not move even when the touch-operation is performed. As is apparent from the following description, when the movement distance M=0 and the input distance D>4 dots, an input direction is set and the player is allowed to input only a direction using the touch panel 13. Therefore, for example, in a case where a movement distance of the player object appearing in a virtual three-dimensional space can be determined based on the input distance, and a direction of the player object is changed based on the input direction, when the input level $I \leq 28\%$ (first mode) and when the input level $I \leq 33\%$ (second mode), the player object can be turned, involving no movement distance, at the same position where the player object has been present, and when the input level I>28% (first mode) and when the input level I>33% (second mode), the moving player object can be turned involving a movement distance. The player can continuously perform the aforementioned two operations in the same input method. Moreover, the game apparatus 1 converts the maximum input level (I=100%) into the maximum movement distance MAX in both modes. A change-over movement distance CP is set in a section in which the maximum movement distance MAX is not obtained, and the input level I is multiplied by a coefficient of a different gradient depending on the mode, and the multiplied input level I is converted into a movement distance M. The gradient used between the movement distance M=0 and the change-over movement distance CP (that is, a low speed movement section) is set smaller than a gradient used between the change-over movement distance CP and the maximum movement distance MAX (a high speed movement section). That is, an amount of change for the movement distance M against an amount of change for the input level I is smaller in the low speed movement section than in the high speed movement section. Therefore, the player is allowed to slightly change the movement distance M on the touch panel 13. Therefore, for example, even when an input distance D corresponding to the maximum input level (I=100%) has a relatively small value, the player can effectively control the touch panel 13 according to whether the player desires to slightly move the player object or the player desires to rapidly move the player object.

Although in the above description, the game apparatus 1 uses a linear function as a conversion equation for converting the input level I into the movement distance M, the conversion equation may be a quadric or higher order function having a variable gradient. A conversion equation for converting an input level I into a value greater than a movement distance M into which the input level I is converted using a conversion equation for the low speed movement section, is used for the high speed movement section, thereby achieving the same effect. For example, while an order of the conversion equation used for the low speed movement section is the same as an order of the conversion equation used for the high speed movement section, a coefficient of the highest order in the conversion equation for the high speed movement section may be greater than a coefficient of the highest order in the conversion equation for the low speed movement section. Furthermore, an order of the conversion equation for the high speed movement section may be greater than an order of the conversion equation for the low speed movement section. Furthermore, the respective conversion equations used in the low speed movement section and the high speed movement section do not necessarily have to provide consecutive values, and non-consecutive conversion functions may be used in the respective sections. Moreover, in the above description, when the low speed movement section changes to the high speed movement section (that is, at the change-over movement distance CP), the respective conversion equations are determined so as not to abruptly change between the movement distances M. However, the respective conversion equations may be determined so as to abruptly increase the movement distance M when the low speed movement section changes to the high speed movement section.

An input level I is calculated according to the input distance D as described above, and the movement distance M is calculated based on the input level I. Thereby, the respective operation instruction areas Z1 to Z5 are provided for each mode as the respective concentric areas toward an outer circumference of a circle having a reference position at the center thereof, from the center. As shown in FIGS. 6 and 7, for the first mode "mode1", a tolerance area (operation instruction area Z1: 0=D=4 dots), an area in which only a direction can be indicated (operation instruction area Z2: 4 dots<D=10 dots), a low speed movement area (operation instruction area Z3: 10 dots<D=21 dots), a high speed movement area (operation instruction area Z4: 21 dots<D=36 dots), and a maximum speed movement area (operation instruction area Z5: 36 dots<D) are provided in this order from the reference position toward the outer circumference. The areas provided for the first mode "mode1" correspond to the input levels I having the following values, respectively. The input level I is 0% in the operation instruction area Z1, the input level I is 0%<I=28% in the operation instruction area Z2, the input level I is 28%<I=58% in the operation instruction are a Z3, the input level I is 58%<I=100% in the operation instruction area Z4, and the input level I is 100% in the operation instruction area Z5.

On the other hand, as shown in FIGS. 6 and 8, for the second mode "mode2", a tolerance area (operation instruction area Z1: 0=D=4 dots), an area in which only a direction can be indicated (operation instruction area Z2: 4 dots<D=16 dots), a low speed movement area (operation instruction area Z3: 16 dots<D=32 dots), a high speed movement area (operation instruction area Z4: 32 dots<D=48 dots), and a maximum speed movement area (operation instruction area Z5: 48 dots<D) are provided in this order from the reference position toward the outer circumference. The areas provided in the second mode "mode2" correspond to the input levels I having the following values, respectively. The input level I is 0% in the operation instruction area Z1, the input level I is 0%<I=33% in the operation instruction area Z2, the input level I is 33%<I=66% in the operation instruction area Z3, the input level I is 66%<I=100% in the operation instruction area Z4, and the input level I is 100% in the operation instruction area Z5.

As is apparent from FIGS. 4 to 8, a minimum value of the input distance D corresponding to the maximum input level (I=100%) is set greater in the second mode "mode2" than in the first mode "mode1". Further, a distance from the reference position to an outer circumference of the area in which only a direction can be indicated (operation instruction area Z2) is set so as to have a greater value in the second mode "mode2" than in the first mode "mode1". Furthermore, a distance from the reference position to a boundary at which conversion equations are changed (a boundary between operation instruction areas Z3 and Z4) is set so as to have a greater value in the second mode "mode2" than in the first mode "mode1". In other words, for the second mode "mode2", the operation instruction areas Z2 to Z4 are set wider, and an amount of change for the movement distance M against an amount of change for the input distance D (dot) are set smaller (that is, the gradient is smaller) on the touch panel 13 in the operation instruction areas Z3 and Z4. As described above, the first mode "mode1" is set as a mode in which a player touch-operates the touch panel 13 with his or her finger or a pointing member fitted on the finger, while the second mode "mode2" is set as a mode in which a player touch-operates the touch panel 13 with the stylus 16. In general, when a player touch-operates the touch panel 13 with a stick type instrument such as the stylus 16, the stick type instrument tends to make its input distance longer than the player directly touch-operates the touch panel 13 with his or her finger. This is because a distance between a position at which the player holds the stylus 16 and a position at which the stylus 16 touches the touch panel 13 (that is, a tip of the stylus 16) is long, and therefore the stylus 16 has a longer distance between a fulcrum and a point of action for controlling the touch panel as compared to a case where the player directly touch-operates the touch panel 13 with his or her finger. Therefore, when the player touch-operates the touch panel 13 with the stylus 16, it is difficult to make an input having a short distance. Therefore, the respective areas are set winder in a mode in which the stylus 16 is used. That is, the game apparatus 1 switches between the first mode "mode1" and the second mode "mode2" described above, thereby obtaining an appropriate game parameter according to a method for controlling the touch panel. In the present embodiment, two modes, that is, a mode used for a finger and a mode used for a stylus are provided. However, the modes may be determined according to, for example, whether the player is an adult or a child or whether the player is male or female, in consideration of a size of the player's finger. Further, players having the same size of fingers may have different dexterities of fingers. Eventually, the player may select his or her desired one of two modes. An input level corresponding to an outer circumference of the area (Z2) in which only a direction can be indicated is set greater in the second mode "mode2" than in the first mode "mode1". Furthermore, an input level corresponding to a boundary at which the conversion equations are changed (the boundary between the operation instruction areas Z3 and Z4) is set greater in the second mode "mode2" than in the first mode "mode1".

As another example, the game apparatus 1 calculates a movement distance Mt according to an input level I (%) as shown in FIG. 9. For example, the movement distance Mt shown in FIG. 9 is one of a plurality of game parameters, indicating a movement distance per unit time in a specific operation (specific condition) different from a normal operation in which a player character appearing in a game space moves on a field provided in the game space. For example, the aforementioned specific operation includes an operation of a player character climbing a tree in a game space. In this case, the game apparatus 1 uses the same conversion equation for converting the input level I into the movement distance Mt for both modes described above.

In the specific operation, the game apparatus 1 converts the input level I (%) into the movement distance Mt in both the first mode "mode1" and the second mode "mode2" using the conversion equation represented as:

$$M=0 (I=12.5\%)$$

$$M=(MAXt/100)*I (12.5\%<I=100\%)$$

Here, MAXt represents a maximum movement distance MAXt per unit time over which the player character is allowed to move in the specific operation.

Although above-described is an example where the game apparatus 1 converts the input level I into the movement distance Mt in the specific operation, the input level I may be used so as to obtain another game parameter. For example, in a case where the specific operation is an operation of a player character diving into the water in a game space, an angle at which the player character dives into the water is set as a game parameter and the angle may be changed according to the input level I.

Figure 10:
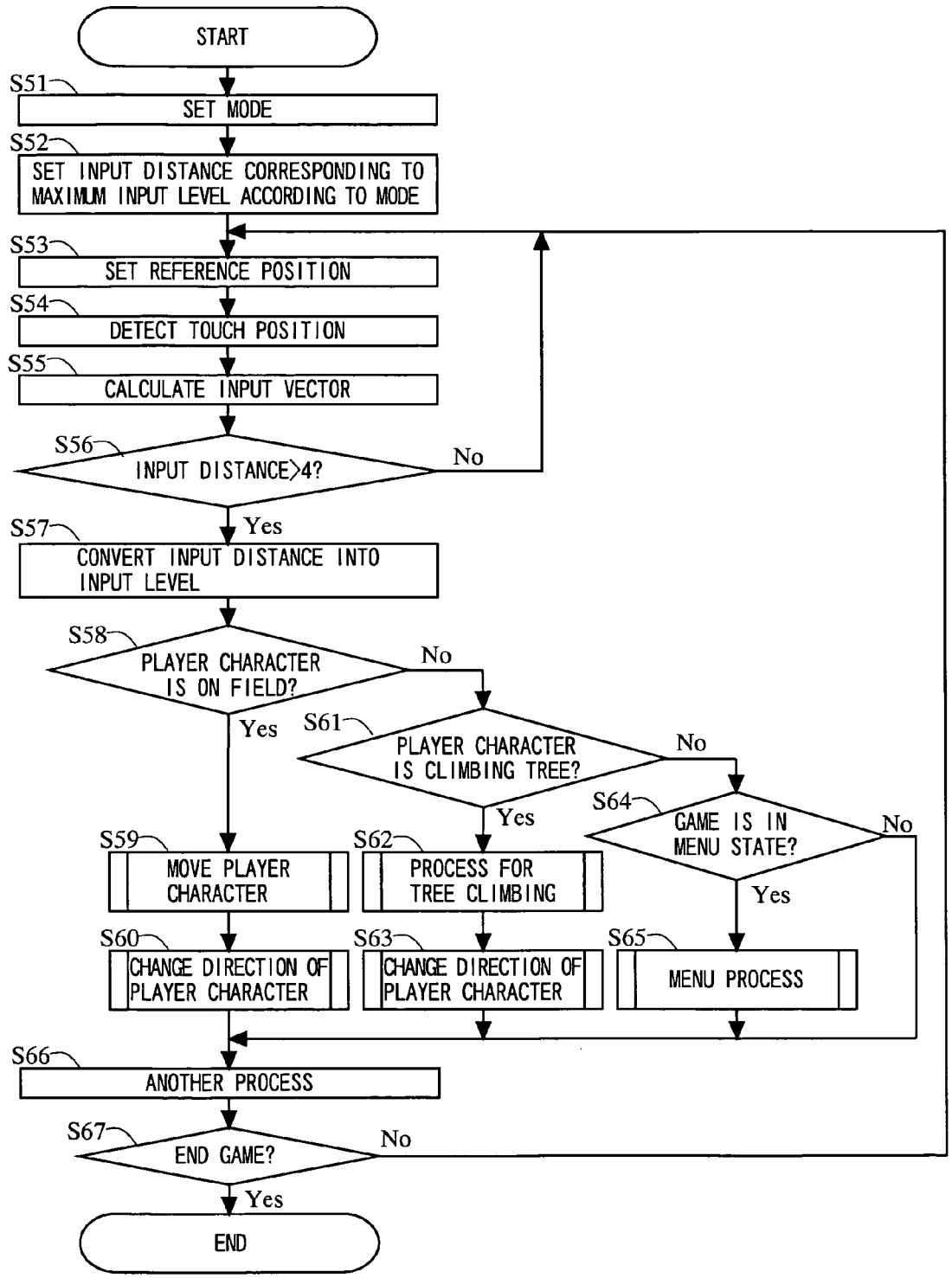
FIG. 10 is a flow chart illustrating a game process performed by the game apparatus 1 by executing the game program according to an embodiment.
Figure 11:
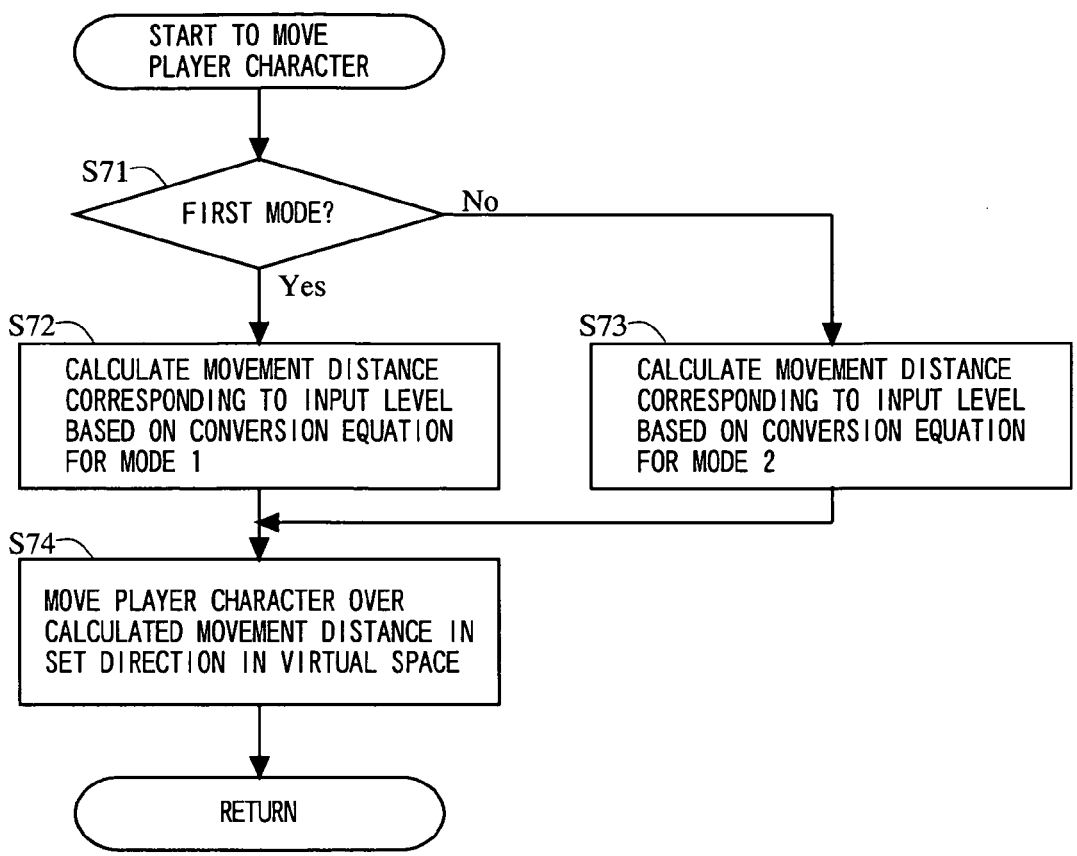
FIG. 11 shows a subroutine as a detailed operation of moving a player character in step 59 shown in FIG. 10.
Figure 12:
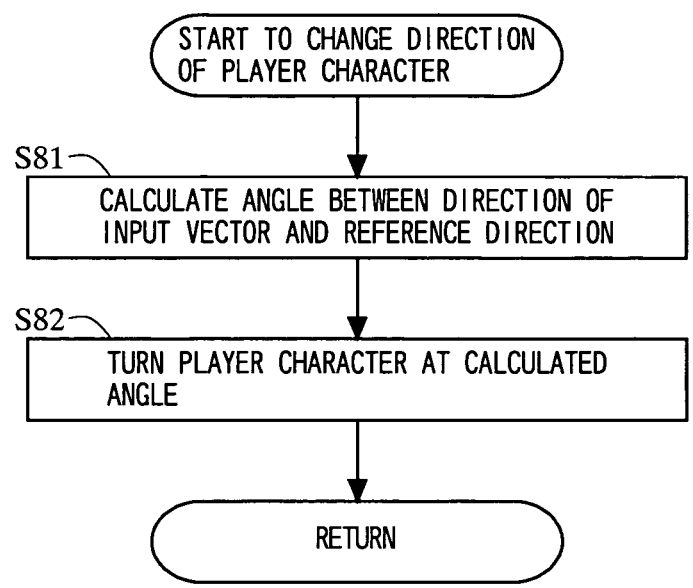
FIG. 12 shows a subroutine as a detailed operation of changing a direction of a player character in steps 60 and 63 shown in FIG. 10.
Figure 13:
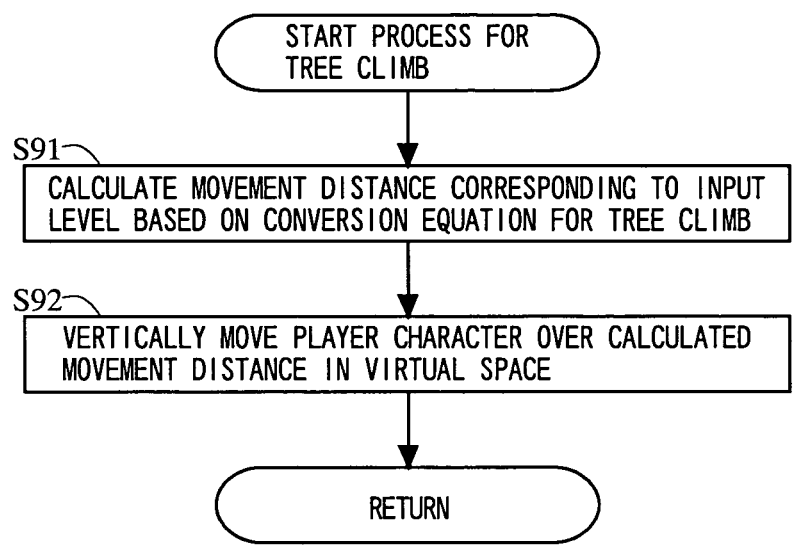
FIG. 13 shows a subroutine as a detailed operation of a tree climb in step 62 shown in FIG. 10.

Next, a game process which is based on information inputted from the touch panel 13 and which is executed by the game apparatus 1 according to the game program of the present invention will be described with reference to FIGS. 10 to 14. FIG. 10 is a flow chart illustrating an operation of the game apparatus 1 processing a game by executing the game program. FIG. 11 shows a subroutine as a detailed operation of a movement operation in step 59 shown in FIG. 10. FIG. 12 shows a subroutine as a detailed operation of direction change in steps 60 and 63 shown in FIG. 10. FIG. 13 shows a subroutine as a detailed operation of a tree climb in step 62 shown in FIG. 10. FIG. 14 shows a subroutine as a detailed operation of processing a menu in step 65 shown in FIG. 10. Programs for executing these processes are contained in a game program stored in the ROM 171. When a power source of the game apparatus 1 is turned on, the program is loaded from the ROM 171 to the WRAM 22, and executed by the CPU core 21.

Firstly, when the power source (not shown) of the game apparatus 1 is turned on, the CPU core 21 executes a boot program (not shown), whereby the game program stored in the cartridge 17 is loaded to the WRAM 22. The game program having been loaded is executed by the CPU core 21, thereby executing steps (abbreviated as "S" in FIGS. 10 to 14) shown in FIG. 10. The game program is executed, whereby game images and the like in accordance with the game program are written into the first LCD 11 and the second LCD 12. The detailed description is not given of the contents of the game. Here, the game process based on information inputted from the touch panel 13 will be described in detail.

In FIG. 10, the CPU core 21 sets a mode in step 51, and advances the process to the next step. The mode is set according to, for example, a method for touch-operating the touch panel 13 as described above. Specifically, a player operates the operation switch section 14 of the game apparatus 1 so as to select a desired mode (that is, the first mode "mode1" or the second mode "mode2"), whereby the CPU core 21 sets a mode.

Next, in step 52, the CPU core 21 sets an input distance corresponding to a maximum input level according to the mode having been set in step 51, and advances the process to the next step. For example, as an example shown in FIG. 4, in a case where the first mode "mode1" is set, the CPU core 21 sets the input distance D=36 dots as the maximum input level I=100%. On the other hand, in a case where the second mode "mode2" is set, the CPU core 21 sets the input distance D=48 dots as the maximum input level I=100%.

Next, the CPU core 21 sets a reference position on the touch panel 13 (see FIG. 3), stores the reference position in a storage area of the WRAM 22 in step 53, detects a touch position at which the player touch-operates the touch panel 13 in step 54, and advances the process to the next step. For example, the CPU core 21 may fixedly set the reference position as the center of the touch panel 13, or may set the reference position as a position at which the player touches on the touch panel 13. For easier description, the description will be given of a case where the reference position is fixedly set at the center of the touch panel 13.

Next, the CPU core 21 calculates, as an input vector, a vector connecting from the reference position having been set in step 53 to the touch position having been detected in step 54 (see FIG. 3) in step 55, and determines whether or not an input distance of the input vector has a value greater than 4 dots in step 56. In a case where the input distance has a value smaller than or equal to 4 dots, the CPU core 21 returns the process to step 53 and repeats the process. On the other hand, in a case where the input distance has a value greater than 4 dots, the CPU core 21 advances the process to the next step 57.

In step 57, the CPU core 21 converts the input distance into an input level according to the mode having been set, and advances the process to the next step. For example, the CPU core 21 calculates an input level I based on the input distance D using a conversion equation according to the mode as described with reference to FIG. 4.

Next, the CPU core 21 determines whether or not a player character is positioned in afield in a game space (normal operation) in step 58, whether or not the player character is climbing a tree in the game space (specific operation) in step 61, and whether or not the game is in a menu state in step 64. In a case where the player character is positioned in the field (Yes in step 58), the CPU core 21 advances the process to the next step 59. On the other hand, in a case where the player character is climbing a tree (Yes in step 61), the CPU core 21 advances the process to the next step 62. Further, in a case where the game is in a menu state (Yes in step 64), the CPU core 21 advances the process to the next step 65. On the other hand, in a case where the player character is not positioned in the field and is not climbing the tree, and the game is not in the menu state (No in steps 58, 61, and 64), the CPU core 21 advances the process to the next step 66.

In step 59, the CPU core 21 moves the player character on the field. The CPU core 21 changes a direction of the player character in step 60, and advances the process to the next step 66. Hereinafter, detailed operations of moving the player character in step 59 and changing a direction of the player character in step 60 will be described with reference to FIGS. 11 and 12, respectively.

In FIG. 11, the CPU core 21 determines whether or not the mode having been set in step 51 is a first mode "mode1" in step 71. In a case where the mode is set to the first mode "mode1", the CPU core 21 advances the process to the next step 72. On the other hand, in a case where the mode is set to the second mode "mode2", the CPU core 21 advances the process to the next step 73.

In step 72, the CPU core 21 calculates a movement distance based on the input level obtained in step 57 using a conversion equation for calculating a movement distance based on an input level for the first mode "mode1", and advances the process to the next step 74. For example, the CPU core 21 converts the input level I (%) into the movement amount M using the conversion equation for the first mode "mode1" as described with reference to FIG. 5.

On the other hand, in step 73, the CPU core 21 calculates a movement distance based on the input level obtained in step 57 using a conversion equation for calculating a movement distance based on an input level for the second mode "mode2", and advances the process to the next step 74. For example, the CPU core 21 converts the input level I (%) into the movement distance M using the conversion equation for the second mode "mode2" as described with reference to FIG. 5.

In step 74, the CPU core 21 moves the player character in the game space over the calculated movement distance in a direction of the input vector having been set (input direction: see FIG. 3), and ends the process according to the subroutine.

In FIG. 12, the CPU core 21 calculates an angle between the direction of the input vector and a reference direction on the touch panel 13 (see FIG. 3) in step 81. In step 82, the CPU core 21 turns the player character in the game space at the angle calculated in step 81, and ends the process according to the subroutine.

Here, in a case where used is a conversion equation for converting an input level into a movement distance 0 in step 72 or step 73 (for example, the section of I=28% for the first mode "mode1" or the section of I=33% for the second mode "mode2" as shown in FIG. 5), the CPU core 21 obtains the movement distance 0. On the other hand, the game is processed according to an input direction in steps 81 and 82 even when the movement distance has a value of 0, and therefore the CPU core 21 eventually performs game process based on only the input direction obtained through the touch operation. That is, the player is allowed to indicate only one game parameter (direction) through the touch-operation using the operation instruction area Z2 formed on the touch panel 13 (see FIGS. 7 and 8). Further, in a case where a conversion equation having a smaller gradient is used in step 72 or step 73 (for example, the section of 28%<I=58% for the first mode "mode1" or the section of 33%<I=66% for the second mode "mode2" as shown in FIG. 5), the CPU core 21 calculates a movement distance having a relatively small amount of change against an amount of change for input level. Therefore, the player is allowed to slightly adjust the movement distance using the operation instruction area Z3 formed on the touch panel 13 (see FIGS. 7 and 8).

Returning to FIG. 10, in a case where the player character is climbing the tree (Yes in step 61), the CPU core 21 performs a process for the player character's tree climbing in step 62. The CPU core 21 changes a direction of the player character in step 63, and advances the process to the next step 66. The process for changing a direction of the player character in step 63 is the same as step 60 described with reference to FIG. 12, whereby the detailed description is not given. Hereinafter, a detailed operation of the tree climb in step 62 will be described with reference to FIG. 13.

In FIG. 13, the CPU core 21 calculates a movement distance based on the input level obtained in step 57 using a conversion equation for converting an input level into a movement distance for the process of tree climb in step 91. For example, the CPU core 21 converts an input level I (%) into a movement distance Mt using the conversion equation used for the specific operation as described with reference to FIG. 9. The CPU core 21 vertically moves the player character in the game space over the movement distance calculated in step 91, and ends the process according to the subroutine.

Returning to FIG. 10, in a case where the game is in a menu state (Yes in step 64), the CPU core 21 performs a menu process in step 65, and advances the process to the next step 66. Hereinafter, a detailed operation for the menu process in step 65 will be described with reference to FIG. 14. Here, in the menu process, the player selects an option (menu) displayed on a game screen, thereby performing a game process according to the option, unlike in the case of a process of moving the player character in the game space.

In FIG. 14, the CPU core 21 determines whether or not the input level obtained in step 57 is greater than or equal to 3% in step 91. That is, in step 91, the CPU core 21 determines whether or not an effective touch-operation has been performed as a selection of a menu, and when the input is too small, the input is not regarded as effective. If such a determination purpose is satisfied, a threshold value for the determination is not restricted to 3%. In a case where the input level is greater than or equal to 3%, the CPU core 21 advances the process to the next step 92. On the other hand, in a case where the input level is smaller than 3%, the CPU core 21 ends the process according to the subroutine.

In step 92, the CPU core 21 calculates an angle between a direction of the input vector and the reference direction (see FIG. 3) on the touch panel 13. The CPU core 21 determines whether or not another option is present in the direction of the calculated angle in step 93. In the case of the other option being present, the CPU core 21 sets the other option present in the direction, as an option for the player in step 94, and ends the process according to the subroutine. On the other hand, in the case of the other option being not present, the CPU core 21 ends the process according to the subroutine.

Returning to FIG. 10, in step 66, the CPU core 21 performs another process such as controlling a virtual camera positioned in the game space or controlling an opponent character of the player character. Step 66 is not directly related to the present invention, and more detailed description is not given. The CPU core 21 determines whether or not the game is to be ended in step 67. In a case where the game is to be continued, the CPU core 21 returns the process to step 53 and repeats the process. In a case where the game is to be ended, the CPU core 21 ends the process according to the flow chart.

Thus, the game apparatus executing the game program according to the present embodiment provides a section in which an amount of change for the movement distance against an amount of change for the input level is relatively small (operation instruction area Z3), thereby allowing the player to slightly change the movement distance using the touch panel 13. Further, the player can indicate only one game parameter (direction) through the touch-operation using the operation instruction area Z2 formed on the touch panel 13. Moreover, a plurality of modes (the first mode "mode1" and the second mode "mode2") are provided according to a method for controlling the touch panel, thereby obtaining an appropriate game parameter depending on the method for controlling the touch panel. In the process depending on the mode, an input distance can be converted into an input level using a different conversion equation depending on the mode, and the game can be processed based on the input level. That is, the game process is the same between the different modes after the input level is calculated (for example, calculation of the movement distance Mt shown in FIG. 9). Therefore, a plurality of modes for different controllabilities can be realized in the same game process.

In the above description, in order to specifically describe the present embodiment, the respective conversion equations and the threshold values are described using specific numerical values. However, it should be understood that these numerical values are examples, and the numerical values of the exemplary embodiment are not limited thereto. For example, in a technique for converting the input level into the movement distance, a conversion equation for converting an input level into a value greater than a movement distance into which the input level is converted using a conversion equation used for a certain section is used for another section, thereby achieving the same effect.

Although in the present embodiment a touch panel is used as an input device for the game apparatus 1, another pointing device may be used. Here, the pointing device is an input device for designating an input position or coordinates on a screen. For example, when a mouse, a track pad, a track ball or the like is used as an input means and information concerning a screen coordinate system, which is calculated based on an output value which is outputted by the input means, is used, the present invention can be realized in a similar manner.

In addition, in the present embodiment, the touch panel 13 is integrated into the game apparatus 1. Needless to say, however, also when the game apparatus and the touch panel are separately provided, the exemplary embodiment presented herein can be realized. Further, although in the present embodiment two display devices are provided, the number of display devices provided can be one. That is, in the present embodiment, it is also possible to provide only the touch panel 13 without the second LCD 12 being provided. In addition, in the present embodiment, the second LCD 12 is not provided and the touch panel 13 may be provided on the upper principal face of the first LCD 11.

Moreover, although in the present embodiment the touch panel 13 is integrated into the game apparatus 1, the touch panel may be used as one of input devices for an information processing apparatus such as a typical personal computer. In this case, a program executed by the computer in the information processing apparatus is not limited to a game program which is typically used for a game, and the program is a general-purpose program which enables the movement distance obtained in the above-described method and the like to be used for a process (for example, moving a cursor and the like) performed in the information processing apparatus.

The storage medium having a game program stored thereon and the game apparatus according to the exemplary embodiment presented herein are capable of realizing an operation involving a small movement and an operation performed using a pointing device based on only one parameter selected by a player, and are applicable for a game processed using the pointing device and the like.

While the exemplary embodiment presented herein has been described in detail, the foregoing description is in all aspects illustrative and not restrictive. It is understood that numerous other modifications and variations can be devised without departing form the scope of the exemplary embodiment.

What is claimed is:

1. A non-transitory storage medium having stored thereon a game program executed by a computer in a game apparatus which is operated using a pointing device for outputting coordinate information based on a given coordinate system according to an operation of a player, wherein
the computer is operable to execute:
selecting one of a first mode and a second mode based on a selection from the player;
setting reference coordinates in the coordinate system;
storing the reference coordinates;
setting designated coordinates in the coordinate system based on the coordinate information outputted by the pointing device;
calculating a distance from the reference coordinates to the designated coordinates;
a first parameter determination for converting, when the first mode is selected in the selecting, the distance calculated in the calculating into a predetermined input level parameter using a first conversion function;
a second parameter determination for converting, when the second mode is selected in the selecting, the distance calculated in the calculating into the input level parameter using a second conversion function; and
performing a game process, by using one of the parameter determined in the first parameter determination and the parameter determined in the second parameter determination, according to a selection in the selecting between the first mode and the second mode, wherein
the calculating further calculates a direction from the reference coordinates to the designated coordinates,
the game process is performed based on only the direction calculated in the calculating when the selecting selects the first mode and the parameter determined in the first parameter determination is smaller than a first threshold value, or when the selecting selects the second mode and the parameter determined in the second parameter determination is smaller than a second threshold value, and
the game process is performed based on the parameter and the direction when the selecting selects the first mode and the parameter determined in the first parameter determination is greater than or equal to the first threshold value, or when the selecting selects the second mode and the parameter determined in the second parameter determination is greater than or equal to the second threshold value.

2. The non-transitory storage medium having the game program stored thereon according to claim 1, wherein
the second conversion function is a function for converting the distance calculated in the calculating into a value smaller than a value into which the distance calculated in the calculating is converted using the first conversion function.

3. The non-transitory storage medium having the game program stored thereon according to claim 1, wherein
the game program causes the computer to further execute a reference distance setting for setting, when the first mode is selected in the selecting, a first reference distance as a reference for the distance calculated in the calculating, and setting, when the second mode is selected in the selecting, a second reference distance as a reference for the distance calculated in the calculating,
the first conversion function used in the first parameter determination is a function for calculating, as the parameter, a ratio of the distance calculated in the calculating to the first reference distance set in the reference distance setting, and
the second conversion function used in the second parameter determination is a function for calculating, as the parameter, a ratio of the distance calculated in the calculating to the second reference distance set in the reference distance setting.

4. The non-transitory storage medium having the game program stored thereon according to claim 3, wherein
when the selecting selects the first mode and the distance calculated in the calculating is longer than the first reference distance, the first parameter determination determines the parameter as a ratio of 100% using the first conversion function, and
when the selecting selects the second mode and the distance calculated in the calculating is longer than the second reference distance, the second parameter determination determines the parameter as a ratio of 100% using the second conversion function.

5. The non-transitory storage medium having the game program stored thereon according to claim 3, wherein
the pointing device is a touch panel,
the first mode is used when a player directly touch-operates the touch panel with a finger;
the second mode is used when a player touch-operates the touch panel with a tip of a stick member; and
the reference distance setting sets the second reference distance to be longer than the first reference distance.

6. The non-transitory storage medium having the game program stored thereon according to claim 1, wherein
the game process determines a movement speed of a game object appearing in a virtual game space based on the parameter.

7. The non-transitory storage medium having the game program stored thereon according to claim 1, wherein
the calculating further calculates a direction from the reference coordinates to the designated coordinates, and
the game process is performed based on the parameter and the direction.

8. The non-transitory storage medium having the game program stored thereon according to claim 7, wherein
the game process determines a direction of a game object appearing in a virtual game space based on the direction.

9. The non-transitory storage medium having the game program stored thereon according to claim 1, wherein
the reference coordinate setting sets, as the reference coordinates, designated coordinates which are initially set in the designated coordinate setting.

10. The non-transitory storage medium having the game program stored thereon according to claim 1, wherein
the game program causes the computer to further execute:

a first game parameter determination for converting, when a parameter determined in the first parameter determination is smaller than a first threshold value, the parameter into a game parameter using a third conversion function;

a second game parameter determination for converting, when a parameter determined in the first parameter determination is greater than or equal to the first threshold value, the parameter into the game parameter using a fourth conversion function for converting the parameter into a value greater than a value into which the parameter is converted using the third conversion function;

a third game parameter determination for converting, when a parameter determined in the second parameter determination is smaller than a second threshold value, the parameter into the game parameter using a fifth conversion function; and a fourth game parameter determination for converting, when a parameter determined in the second parameter determination is greater than or equal to the second threshold value, the parameter into the game parameter using a sixth conversion function for converting the parameter into a value greater than a value into which the parameter is converted using the fifth conversion function, and the game process is performed using the game parameter determined in the first game parameter determination or the second game parameter determination, when the selecting selects the first mode, and the game process is performed using the game parameter determined in the third game parameter determination or the fourth game parameter determination, when the selecting selects the second mode.

11. The non-transitory storage medium having the game program stored thereon according to claim 10, wherein the second threshold value is greater than the first threshold value.

12. The non-transitory storage medium having the game program stored thereon according to claim 1, wherein the second threshold value is greater than the first threshold value.

13. A game apparatus operated using a pointing device for outputting coordinate information based on a given coordinate system according to an operation of a player, the game apparatus comprising:

a processing system, including one or more computer processors, configured to:

set reference coordinates in the coordinate system;

store the reference coordinates in reference coordinate storage locations;

set designated coordinates in the coordinate system based on the coordinate information outputted by the pointing device;

calculate a distance from the reference coordinates to the designated coordinates;

select one of a first mode and a second mode based on a selection from the player;

determine a first parameter for converting, when the first mode is selected, the calculated distance into a predetermined input level parameter using a first conversion function;

determine a second parameter for converting, when the second mode is selected, the calculated distance into the input level parameter using a second conversion function;

perform a game process, by using one of the determined first parameter and the determined second parameter, according to a selection between the first mode and the second mode, and further calculate a direction from the reference coordinates to the designated coordinates, wherein the game process is performed based on only the calculated direction between the reference coordinates to the designated coordinates when the first mode is selected and the determined first parameter is smaller than a first threshold value, or when the second mode is selected and the determined second parameter is smaller than a second threshold value, and the game process is performed based on the parameter and the calculated direction when the first mode is selected and the determined first parameter is greater than or equal to the first threshold value, or when the second mode is selected and the determined second parameter is greater than or equal to the second threshold value.

14. A non-transitory storage medium having stored thereon a program executed by a computer in an information processing apparatus which is operated using a pointing device for outputting coordinate information based on a given coordinate system according to an operation of a user, wherein the computer is operable to execute:

selecting one of a first mode and a second mode based on a selection from the user;

setting reference coordinates in the coordinate system;

storing the reference coordinates;

setting designated coordinates in the coordinate system based on the coordinate information outputted by the pointing device;

calculating a distance from the reference coordinates to the designated coordinates;

a first parameter determination for converting, when the first mode is selected in the selecting, the distance calculated in the calculating into a predetermined input level parameter using a first conversion function;

a second parameter determination for converting, when the second mode is selected in the selecting, the distance calculated in the calculating into the input level parameter using a second conversion function; and processing an operation, by using one of the parameter determined in the first parameter determination and the parameter determined in the second parameter determination, according to a selection in the selecting between the first mode and the second mode, wherein the calculating further calculates a direction from the reference coordinates to the designated coordinates, the processing is performed based on only the direction calculated in the calculating when the selecting selects the first mode and the parameter determined in the first parameter determination is smaller than a first threshold value, or when the selecting selects the second mode and the parameter determined in the second parameter determination is smaller than a second threshold value, and the processing is performed based on the parameter and the direction when the selecting selects the first mode and the parameter determined in the first parameter determination is greater than or equal to the first threshold value, or when the selecting selects the second mode and the parameter determined in the second parameter determination is greater than or equal to the second threshold value.

15. A non-transitory storage medium having stored thereon a game program executed by a computer in a game apparatus which is operated using a pointing device for outputting coordinate information based on a given coordinate system according to an operation of a player, wherein
the computer is operable to execute:
setting reference coordinates in the coordinate system;
storing the reference coordinates;
setting designated coordinates in the coordinate system based on the coordinate information outputted by the pointing device;
calculating a distance from the reference coordinates to the designated coordinates;
parameter determination for converting the distance calculated in the calculating into a predetermined input level parameter using a conversion function; and
performing a game process, by using the parameter determined in the parameter determination, wherein
the calculating further calculates a direction from the reference coordinates to the designated coordinates,
the game process is performed based on only the direction calculated in the calculating when the parameter determined in the parameter determination is smaller than a threshold value, and
the game process is performed based on the parameter and the direction when the parameter determined in the parameter determination is greater than or equal to the threshold value.

16. A game apparatus operated using a pointing device for outputting coordinate information based on a given coordinate system according to an operation of a player, the game apparatus comprising:
a processing system, including one or more computer processors, configured to:
set reference coordinates in the coordinate system;
store the reference coordinates in reference coordinate storage locations;
set designated coordinates in the coordinate system based on the coordinate information outputted by the pointing device;
calculate a distance from the reference coordinates to the designated coordinates;
determine a parameter for converting the calculated distance into a predetermined input level parameter using a conversion function;
perform a game process, by using the determined parameter, and
further calculate a direction from the reference coordinates to the designated coordinates, wherein
the game process is performed based on only the calculated direction between the reference coordinates to the designated coordinates when the determined parameter is smaller than a threshold value, and
the game process is performed based on the parameter and the calculated direction when the determined parameter is greater than or equal to the threshold value.

17. A non-transitory storage medium having stored thereon a program executed by a computer in an information processing apparatus which is operated using a pointing device for outputting coordinate information based on a given coordinate system according to an operation of a user, wherein
the computer is operable to execute:
setting reference coordinates in the coordinate system;
storing the reference coordinates;
setting designated coordinates in the coordinate system based on the coordinate information outputted by the pointing device;
calculating a distance from the reference coordinates to the designated coordinates;
parameter determination for converting the distance calculated in the calculating into a predetermined input level parameter using a conversion function; and
processing an operation, by using the parameter determined in the parameter determination, wherein
the calculating further calculates a direction from the reference coordinates to the designated coordinates,
the processing is performed based on only the direction calculated in the calculating when the parameter determined in the parameter determination is smaller than a threshold value, and
the processing is performed based on the parameter and the direction when the parameter determined in the parameter determination is greater than or equal to the threshold value.

18. An information processing apparatus operated using a pointing device for outputting coordinate information based on a given coordinate system according to an operation of a player, the information processing apparatus comprising:
a processing system, including one or more computer processors, configured to:
set reference coordinates in the coordinate system;
store the reference coordinates in reference coordinate storage locations;
set designated coordinates in the coordinate system based on the coordinate information outputted by the pointing device;
calculate a distance from the reference coordinates to the designated coordinates;
determine a parameter for converting the calculated distance into a predetermined input level parameter using a conversion function; and
perform an information operation process, by using the determined parameter, and
further calculate a direction from the reference coordinates to the designated coordinates, wherein
the information operation process is performed based on only the calculated direction when the determined parameter is smaller than a threshold value, and
the information operation process is performed based on the parameter and the calculated direction when the determined parameter is greater than or equal to the threshold value.

* * * * *